(12) United States Patent
Beaurepaire

(10) Patent No.: US 11,994,396 B2
(45) Date of Patent: May 28, 2024

(54) METHOD AND APPARATUS FOR PROVIDING DROP-OFF LOCATIONS FOR PASSENGERS OF A VEHICLE TO REACH DIFFERENT DESTINATIONS VIA A MULTIMODAL ROUTE

(71) Applicant: HERE GLOBAL B.V., Eindhoven (NL)

(72) Inventor: Jerome Beaurepaire, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 800 days.

(21) Appl. No.: 16/425,599

(22) Filed: May 29, 2019

(65) Prior Publication Data

US 2020/0378771 A1 Dec. 3, 2020

(51) Int. Cl.
*G01C 21/34* (2006.01)
*G01C 21/20* (2006.01)
(Continued)

(52) U.S. Cl.
CPC ......... *G01C 21/3423* (2013.01); *G01C 21/20* (2013.01); *G01C 21/3415* (2013.01);
(Continued)

(58) Field of Classification Search
CPC .............. G06Q 30/0284; G06Q 50/30; G01C 21/3415; G01C 21/3461; G01C 21/3691; G01C 21/20; G01C 21/343
(Continued)

(56) References Cited

U.S. PATENT DOCUMENTS 9,304,009 B2 * 4/2016 Beaurepaire ....... G01C 21/3438
10,775,180 B2 * 9/2020 Tuukkanen ...... G08G 1/096811
(Continued)

FOREIGN PATENT DOCUMENTS

EP 2982936 A1 * 2/2016 ......... G01C 21/3664

OTHER PUBLICATIONS

Bhuiyan, "Indian Ride-hail Player Ola Just Launched Its Own Dockless Bike-sharing Service", Dec. 3, 2017, retrieved from https://www.vox.com/2017/12/3/16728884/ola-india-bike-sharing, pp. 1-5.
(Continued)

*Primary Examiner* — Maceeh Anwari
(74) *Attorney, Agent, or Firm* — DITTHAVONG, STEINER & MLOTKOWSKI

(57) ABSTRACT

An approach is provided for providing drop-off locations for passengers of a vehicle to reach different destinations via a multimodal route. A routing platform receives a request to generate a navigation route, i.e., a multi-point intermodal route that directs the passengers to reach the destinations using the vehicle in combination with the other mode of transport. The routing platform further computes the navigation route based on an optimization parameter to include a route taken by the vehicle and at least one intermodal route leg. The navigation route includes drop-off locations where subsets of the passengers access the other mode of transport to complete the at least one intermodal route leg to at least one of the destinations. The optimization parameter is minimized with respect to the route taken by the vehicle and/or the at least one intermodal route leg.

17 Claims, 15 Drawing Sheets

(51) Int. Cl.
  *G01C 21/36* (2006.01)
  *G06Q 30/0283* (2023.01)
  *G06Q 50/40* (2024.01)
(52) U.S. Cl.
  CPC ..... *G01C 21/3461* (2013.01); *G01C 21/3691* (2013.01); *G06Q 30/0284* (2013.01); *G06Q 50/40* (2024.01)
(58) Field of Classification Search
  USPC ........................................................ 701/411
  See application file for complete search history.

(56) References Cited

U.S. PATENT DOCUMENTS

| | | | | |
|---|---|---|---|---|
| 2013/0304372 | A1* | 11/2013 | Mellert | G01C 21/3476 701/410 |
| 2015/0254581 | A1* | 9/2015 | Brahme | G06Q 10/02 705/5 |
| 2016/0033289 | A1* | 2/2016 | Tuukkanen | G01C 21/34 701/522 |
| 2016/0321566 | A1* | 11/2016 | Liu | G01C 21/3438 |
| 2018/0299277 | A1* | 10/2018 | Iland | G06Q 10/06311 |
| 2019/0376801 | A1* | 12/2019 | Whitt | G08G 1/165 |
| 2020/0041291 | A1* | 2/2020 | Dunnette | G01C 21/3423 |
| 2020/0211140 | A1* | 7/2020 | Horton | G08G 1/005 |
| 2020/0311846 | A1* | 10/2020 | Chen | G08G 1/202 |

OTHER PUBLICATIONS

Fahnenshreiber et al., "A Multi-modal Routing Approach Combining Dynamic Ride-sharing and Public Transport", published in Transportation Research Procedia, vol. 13, 2016, pp. 176-183.

Czioska et al., "Location- and Time-dependent Meeting Point Recommendations for Shared Interurban Rides", published in Journal of Location Based Services, Sep. 26, 2017, pp. 1-23.

* cited by examiner

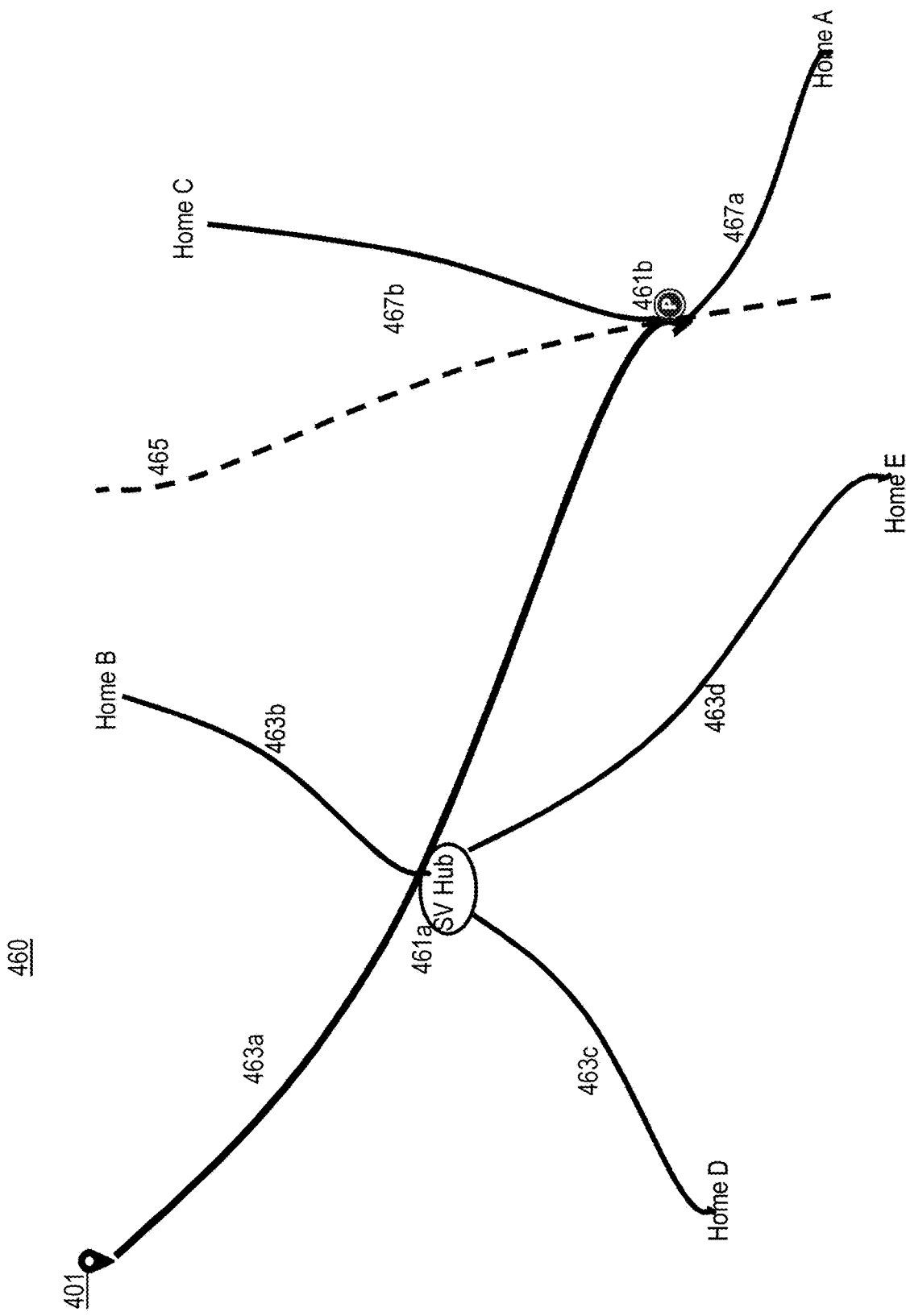

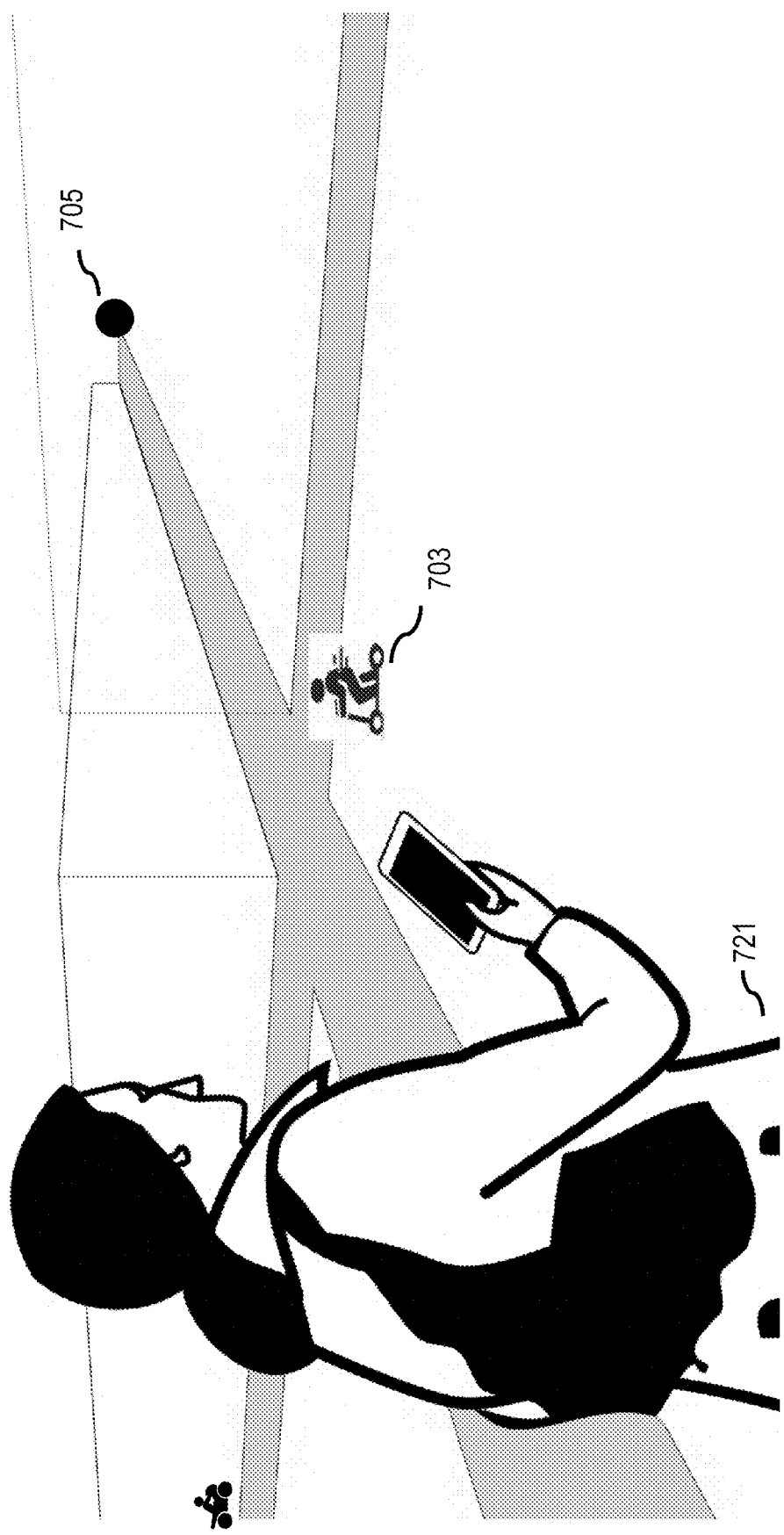

METHOD AND APPARATUS FOR PROVIDING DROP-OFF LOCATIONS FOR PASSENGERS OF A VEHICLE TO REACH DIFFERENT DESTINATIONS VIA A MULTIMODAL ROUTE

BACKGROUND

Service providers and automobile manufacturers are continually challenged to deliver value and convenience to consumers by, for example, providing compelling navigation services. One area of interest has been the development of location-based services to that involve generating an intermodal or multimodal route that uses various modes of transport to take people from a starting point (e.g., a restaurant) after a dinner to various destinations (e.g., homes), without hiring an expensive taxi that drops people off at each destination with significant detouring. However, as the numbers of passengers and intermodal transport options (e.g., shared vehicles and their providers) increase, service providers face significant technical challenges associated with computing a navigation route for the vehicle and drop-off locations for the passengers, to minimize route cost factors (e.g., time, distance, etc.).

SOME EXAMPLE EMBODIMENTS

Therefore, there is a need for an approach for providing drop-off locations for passengers of a vehicle to reach different destinations via a multimodal route.

According to one embodiment, a method comprises receiving a request to generate a navigation route, wherein the navigation route is a multi-point intermodal route that directs a plurality of passengers of a vehicle to reach a plurality of destinations using the vehicle in combination with at least one other mode of transport, and wherein the destinations are different for one or more subsets of the plurality of passengers. The method also comprises computing the navigation route based on an optimization parameter to include a route taken by the vehicle and at least one intermodal route leg, wherein the navigation route includes one or more drop-off locations where the one or more subsets of the plurality of passengers can access the at least one other mode of transport to complete the at least one intermodal route leg to at least one destination of the destinations, and wherein the optimization parameter is minimized with respect to the route taken by the vehicle, the at least one intermodal route leg, or a combination thereof. The method further comprises providing the one or more drop-off locations, the navigation route, or a combination thereof as an output.

According to another embodiment, an apparatus comprises at least one processor, and at least one memory including computer program code for one or more computer programs, the at least one memory and the computer program code configured to, with the at least one processor, receive a request to generate a navigation route, wherein the navigation route is a multi-point intermodal route that directs a plurality of passengers of a vehicle to reach a plurality of destinations using the vehicle in combination with at least one other mode of transport, and wherein the destinations are different for one or more subsets of the plurality of passengers. The apparatus is also caused to compute the navigation route based on an optimization parameter to include a route taken by the vehicle and at least one intermodal route leg, wherein the navigation route includes one or more drop-off locations where the one or more subsets of the plurality of passengers can access the at least one other mode of transport to complete the at least one intermodal route leg to at least one destination of the destinations, and wherein the optimization parameter is minimized with respect to the route taken by the vehicle, the at least one intermodal route leg, or a combination thereof. The apparatus is further caused to provide the one or more drop-off locations, the navigation route, or a combination thereof as an output.

According to another embodiment, a computer-readable storage medium carries one or more sequences of one or more instructions which, when executed by one or more processors, cause, at least in part, an apparatus to receive a request to generate a navigation route, wherein the navigation route is a multi-point intermodal route that directs a plurality of passengers of a vehicle to reach a plurality of destinations using the vehicle in combination with at least one other mode of transport, and wherein the destinations are different for one or more subsets of the plurality of passengers. The apparatus is also caused to compute the navigation route based on an optimization parameter to include a route taken by the vehicle and at least one intermodal route leg, wherein the navigation route includes one or more drop-off locations where the one or more subsets of the plurality of passengers can access the at least one other mode of transport to complete the at least one intermodal route leg to at least one destination of the destinations, and wherein the optimization parameter is minimized with respect to the route taken by the vehicle, the at least one intermodal route leg, or a combination thereof. The apparatus is further caused to provide the one or more drop-off locations, the navigation route, or a combination thereof as an output.

According to another embodiment, an apparatus comprises means for receiving a request to generate a navigation route, wherein the navigation route is a multi-point intermodal route that directs a plurality of passengers of a vehicle to reach a plurality of destinations using the vehicle in combination with at least one other mode of transport, and wherein the destinations are different for one or more subsets of the plurality of passengers. The apparatus also comprises means for computing the navigation route based on an optimization parameter to include a route taken by the vehicle and at least one intermodal route leg, wherein the navigation route includes one or more drop-off locations where the one or more subsets of the plurality of passengers can access the at least one other mode of transport to complete the at least one intermodal route leg to at least one destination of the destinations, and wherein the optimization parameter is minimized with respect to the route taken by the vehicle, the at least one intermodal route leg, or a combination thereof. The apparatus further comprises means for providing the one or more drop-off locations, the navigation route, or a combination thereof as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4D are diagrams of user interfaces showing a navigation route including a route taken by a vehicle and intermodal route legs, according to various embodiments;

FIGS. 7A-7B are diagrams of user interfaces used in the processes for proactive booking of a shared vehicle for an intermodal route leg, according to various embodiments;

DESCRIPTION OF SOME EMBODIMENTS

Examples of a method, apparatus, and computer program for providing drop-off locations for passengers of a vehicle to reach different destinations via a multimodal route are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
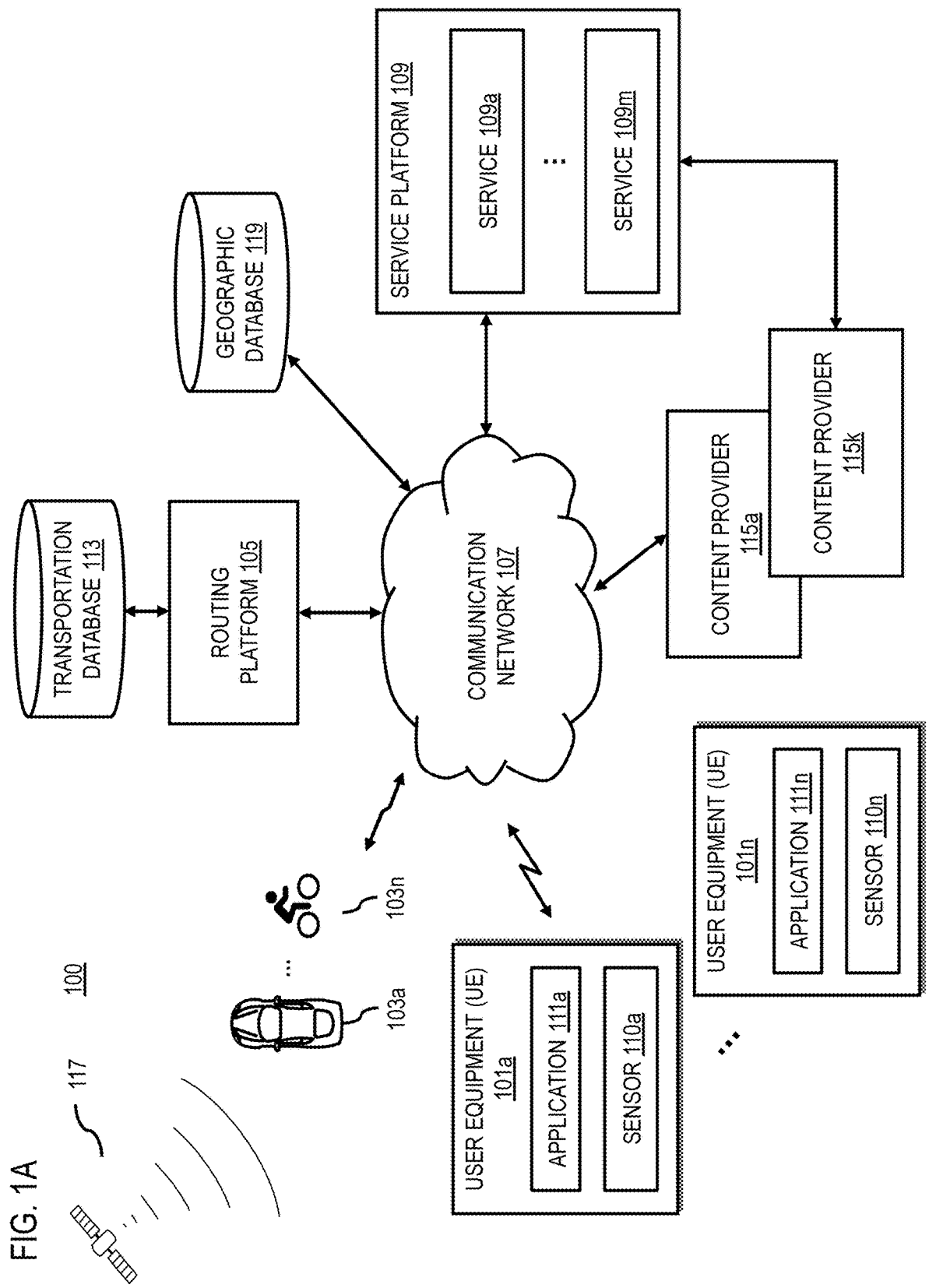
FIG. 1A is a diagram of a system for providing drop-off locations for passengers of a vehicle to reach different destinations via a multimodal route, according to one embodiment.

FIG. 1A is a diagram of a system for providing drop-off locations for passengers of a vehicle to reach different destinations via a multimodal route, according to one embodiment. As transportation options or modes of transport (e.g., personal vehicles, shared vehicles, autonomous vehicles, etc.) increase, more people are willing to share rides to save cost and protect the environment. As a result, one vehicle may be asked to carry multiple passengers to multiple destinations. Traditional fleet management approaches to routing multiple passengers to multiple destinations historically have generated routes using just one mode of transport (e.g., a car, taxi, shuttle bus, etc.) to deliver users to multiple destinations door to door. For example, a taxi carrying multiple passengers with multiple destinations traditionally would drop off each passenger one by one at each destination without considering any other mode of transportation. However, with the increasing availability of alternate modes of transportation (e.g., shared vehicles, public transport, car-pooling services), this traditional approach can lead to inefficient use of available transportation options or mobility solutions (e.g., leading to increased travel times, wasted resources, etc.). As a result, service providers face significant technical challenges to providing routing solutions for a vehicle carrying multiple passengers to multiple destinations while leveraging available multimodal transportation options (i.e., options using multiple different modes of transport). For example, when driving some friends or colleagues after a dinner, party, and/or any other event, it may not always be possible for the driver to bring everyone home to their ultimate destinations. In this case, service providers face the technical challenge of helping the driver find the most optimal drop-off point(s) for his or her passengers considering their respective destinations.

This demand for generating a navigation route to guide one vehicle to drop passengers off at various locations in combination with transfers to other modes of transport increases routing complexity. This is because the locations, availability, service areas, range, etc. of shared vehicles can be very volatile, and can therefore make knowing what transport options are available and when much more complex and difficult. In addition, the large numbers of available shared vehicles and/or corresponding providers of the shared vehicles (e.g., mobility providers) within a given area can also make determining the optimal intermodal routes difficult.

To address this problem, a system 100 of FIG. 1A introduces a capability to allow a vehicle (or driver of the vehicle) to bring several passengers closer to their respective destinations by recommending optimal drop-off locations for those passengers based on all transport options available to those passengers (e.g., including shared vehicles, public transport, travel hubs, etc.). In other words, the system 100 considers multiple modes of transport available along the way to drop-off the passengers and develops a multi-point intermodal route that includes a route taken by the vehicle to the recommended drop-off locations and intermodal route legs from each recommended drop-off location for the passengers to ride on at least one other mode of transport (e.g., other than the initial vehicle in which they were carried) to get to a respective destination. By way of example, the system 100 considers various modes of transport to take passengers from a starting point (e.g., an office, restaurant, movie theater, etc.) to the various and different destinations (e.g., homes, another event location, etc.) of the passengers.

In one embodiment, the system 100 can use a routing cost function, dynamic (or real time) traffic monitoring and timing adjustments to identify an optimal navigation route including a vehicle route to respective drop-off locations and one or more intermodal route legs to respective destinations of the passengers. Optimal, for instance, refers to a navigation route that enables the vehicle to drop off the passengers to ride another mode of transport on a respective intermodal route leg to reach a final destination with a time, distance, etc. that meets threshold requirements or is a minimum among calculated intermodal route legs, the other modes of transport, and/or locations.

For the purpose of illustration herein, a drop-off location may include location information for indicating where a user (e.g., passenger) is to exit a vehicle which continues travelling with the remaining passengers. In addition, the drop-off location may be a handover location where the first driver exits the vehicle and another passenger takes over the driving.

In other embodiments, the system 100 optimizes the navigation route based on at least one of (1) a total travel time or a total travel distance for the route taken by the vehicle, a least amount of detour for the route taken by the vehicle, wherein the detour is determined with respect to a respective destination of the destinations that is associated with the vehicle, (2) a travel time or a travel distance for the one or more subsets of the plurality of passengers, (3) a quality level of the at least one intermodal route leg to the least one destination, (4) a number of the one or more drop-off locations, (5) a total travel time or a total travel distance for all of the plurality of passengers, (6) an arrival time of a last passenger of the plurality of passengers at a last destination of the destinations, (7) a safety level of the least one intermodal route leg to the least one destination, (8) a total cost for completing the navigation route to all of the destinations for said all of the plurality of passengers, etc.

By way of example, the system 101 minimizes a driver or a primary user's travel time (or route or other routing cost function parameter such as distance, fuel efficiency, etc.) to a respective destination by considering all possible modes of transport (e.g., public transport buses, trains, cars, pedestrian modes, etc.) along the shortest route to the destination of the driver or the primary user, for dropping off other passengers.

In one embodiment, the system 100 determines alternate modes of transport availability information (e.g., either the availability of alternate modes of transport or the unavailability of alternate modes of transport) based on static transport schedule data, and/or real-time transport tracking data, using intermodal and multimodal routing algorithms. By way of example, the alternate modes of transport may include a public transit mode, a pedestrian mode, a bicycling mode, a shared vehicle, etc. The public transit mode may include micro-transit solutions that work on an on-demand basis. A shared vehicle may be a car, a motorcycle, an electric bike, an electric scooter, a bicycle, a kickboard, a mini scooter, a boat, as an autonomous rental vehicle, taxi-robot, etc. owned by an individual, a commercial business, a public agency, a cooperative, or an ad hoc grouping.

Since shared vehicle services generally offer a fleet of vehicles that can be "booked" or reserved for use by end users, the system 100 offers to the passengers reservation services of the other mode of transport to enable each passenger to reach a respective destination more efficiently by skipping the waiting time for the other mode of transport and allowing a non-interrupted and less frustrating journey.

In one embodiment, the system 100 can dynamically change a mode of transport reservation before it expires and route the passenger to another mode of transport for riding to a respective destination (as opposed, e.g., to manually changing the vehicle reservation in traditional methods) based on monitoring the vehicle's progress and the availability of the reserved mode of transport. The system 100 can then use the monitored progress to determine or predict whether the vehicle will be able to reach a respective drop-off location and whether to dynamically re-book based on any booking constraints (e.g., reservation expiration times, mode of transport availability, etc.).

Although various embodiments are described with respect to a transfer from a no-reservation-required mode of transport to a reservation-required mode of transport, it is contemplated that the approach described herein may be used with other types of transfers, such as a transfer from a reservation-required mode of transport to another reservation-required mode of transport, and the system 100 can handle any numbers of such transfers towards the user destination.

The other mode of transport (e.g., a car, motorcycle, electric bike, electric scooter, bicycle, boat, airplane, autonomous rental vehicle, taxi-robot, etc.) can be human-operated, semi-autonomous, or autonomous. In another embodiment, the other mode of transport is owned by a business entity, a public entity, a stranger, or a contact of the user, and the contact or stranger agrees to operate the vehicle to a meeting point, to either handover the vehicle to the user or to continue riding together with the user to a destination. These embodiments are applicable to centralized ride-sharing, peer-to-peer ride-sharing, car-pooling, taxi cabs, food delivery, etc.

In one embodiment, the system 100 includes one or more processes for automatically determining one or more drop-off points including one or more dynamic handover points for changing drivers, providing guidance to the passengers to reach respective destinations using the mode of transport reservations and/or any changes made according to the embodiments described herein. In one embodiment, the system 100 receives a passenger request to explicitly reserve the mode of transport to travel to a respective destination. In another embodiment, the system 100 detects a user travel pattern/habit and/or mobility graph and predicts the passenger's need for reserving a mode of transport to reach a destination. In yet another embodiment, the system 100 detects the passenger's need for reserving a mode of transport from an entry in the passenger's calendar, a social media event accepted or signed up by the passenger, an event in the passenger's message (e.g., email, text message, instant message, SMS message, MMS message, etc.).

In one embodiment, user equipment (UE) 101 of vehicle users and sensors in a vehicle 103 are collecting and reporting data (e.g., location data) to the system 100 to support the determining candidate drop-off locations, a navigation route, and/or vehicle reservations according to the embodiments described herein. In this way, for instance, vehicles 103a-103n and/or vehicle users can use the system for sharing trajectory data and receiving vehicle supply and demand information as well as contextual data (e.g., traffic, weather conditions, etc.) that can be used to dynamically update the candidate drop-off locations, navigation route, and/or vehicle reservations that optimizes or reduces the amount of cost, time, distance, etc. to the destinations. With this data along with other data such as but not limited to public transport information, the system 100 (e.g., a routing platform 105) can compute a navigation route to passenger destinations and present to a passenger another mode of transport to travel to a respective destination from a drop-off location. In one embodiment, the UEs 101 and the routing platform 105 have connectivity via a communication network 107.

In one embodiment, the vehicles 103a-103n are equipped with a device (e.g., the UE 101 or other accessory device) that records the vehicles' trajectory data (e.g., position, speed, etc.). In one embodiment, the UE 101 may be configured with one or more sensors 110a-110n (also collectively referred to as sensors 110) for determining the trajectory data (including parking locations). By way of example, the sensors 110 may include location sensors (e.g., global positioning system (GPS)), accelerometers, compass sensors, gyroscopes, altimeters, etc.

In one embodiment, after a journey or the trajectory data is recorded (e.g., upon parking), the trajectory data is analyzed (e.g., by respective applications 111a-111n and/or the routing platform 105 for storage in, for instance, a transportation database 113 and/or a geographic database 119) to determine drop-off locations. Applications 111a-111n preform navigation and/or routing functions independently or in conjunction with the routing platform 105. In one embodiment, the routing platform 105 and/or applications 111 receive a user request to compute a navigation route and make modes of transport reservations for passengers.

In another embodiment, the system 100 detects a passenger travel pattern/habit and/or mobility graph via machine learning algorithms and predicts that the passenger requires a mode of transport reservation.

In one embodiment, timestamp information indicates at which time and which location the vehicle was parked/stopped is recorded as a record in the transportation database 113. In one embodiment, the record is then transmitted or uploaded to the routing platform 105. In addition or alternatively, the raw trajectory data may be uploaded to the routing platform 105 to determine the record. In yet another embodiment, the record and/or trajectory data may be maintained at the UE 101 device for local processing to determine vehicle parking/stopping information for transmission to the routing platform 105 and/or other vehicles/UEs 101 (e.g., when operating in a peer-to-peer network architecture).

In one embodiment, when the UE 101 requests an optimal navigation route for the vehicle 103 to drop off passengers, the routing platform 105 computes the optimal navigation route including a route taken by the vehicle and one or more intermodal route legs for the passengers to access the at least one other mode of transport to research a respective destination, based on data from the transportation database 113 and/or the geographic database 119. The alternate mode of transport may include cycling, motorbiking, taking one or more taxis, taking one or more buses, taking one or more trains, taking one or more subways, taking one or more ferries, taking one or more shared vehicles, or a combination thereof.

In another embodiment, the routing platform 105 may present to the passenger information on points of interest, parking areas, road segments, and/or related information retrieved from the geographic database 119, while the passenger is traveling on the other mode of transport leg and/or in the vehicle. In addition or alternatively, such information can be provided by the service platform 109, one or more services 109a-109m (also collectively referred to as services 109), one or more content providers 115a-115k (also collectively referred to as content providers 115), or a combination thereof. For example, the sources of the information may include map data, information inferred from data collected from participating vehicles, or a combination thereof.

In one embodiment, apart from an optimal or recommended candidate route option, the routing platform 105 may also update the information as a map overlay that illustrates, for instance, timestamps, a number of alternate modes of transport available, and fluctuations in the amount of alternate modes of transport, etc. around the user location or position (e.g., a current location of the client UE 101), based on real-time transport data from the transportation database 113.

In one embodiment, vehicles 103 are equipped with a navigation device (e.g., a UE 101) that is capable of submitting to the routing platform 105 requests for routing the vehicle to a drop-off location and of guiding of the passenger subsequently. In one embodiment, as the vehicle and the passenger follow the respective segments, the UE 101 (e.g., via an application 111) and the vehicle 103 may iterate their locations with timestamps to the routing platform 105 in order to update the travel status in a real-time and/or substantially real-time manner while factoring in delay caused by traffic, weather, etc.

As shown in FIG. 1A, the routing platform 105 operates in connection with UEs 101 and vehicles 103 for providing drop-off locations for passengers of a vehicle to reach different destinations via a multimodal route. By way of example, the UEs 101 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system. Also, the UEs 101 may be configured to access a communication network 107 by way of any known or still developing communication protocols. Via this communication network 107, the UE 101 may transmit probe data as well as access various network based services for facilitating providing drop-off locations for passengers of a vehicle to reach different destinations via a multimodal route.

Also, the UEs 101 may be configured with applications 111 for interacting with one or more content providers 115, services of the service platform 109, or a combination thereof. Per these services, the applications 111 of the UE 101 may acquire routing instructions, mode of transport information, traffic information, mapping information and other data associated with the current locations of the vehicle and the passengers, etc. Hence, the content providers 115 and service platform 109 rely upon the gathering of user, vehicle, and modes of transport trajectory data and routing data for executing the aforementioned services.

The UEs 101 and the vehicles 103 may be configured with various sensors 110 for acquiring and/or generating trajectory data regarding the user, a vehicle, other vehicles, conditions regarding the driving environment or roadway, etc. For example, sensors 110 may be used as GPS receivers for interacting with one or more satellites 117 to determine and track the current speed, position and location of a user and/or a vehicle travelling along a roadway. In addition, the sensors 110 may gather tilt data (e.g., a degree of incline or decline of the vehicle during travel), motion data, light data, sound data, image data, weather data, temporal data and other data associated with UEs 101 and/or the vehicle 103 thereof. Still further, the sensors 110 may detect local or transient network and/or wireless signals, such as those transmitted by nearby devices during navigation of a vehicle along a roadway. This may include, for example, network routers configured within a premise (e.g., home or business), another UE 101 or vehicle 103 or a communicable traffic system (e.g., traffic lights, traffic cameras, traffic signals, digital signage). In one embodiment, the routing platform 105 aggregates probe data gathered and/or generated by the UEs 101 and/or the vehicle 103 resulting from the driving of multiple different vehicles over a road/travel network. The probe data may be aggregated by the routing platform 105 to provide drop-off locations for passengers of a vehicle to reach different destinations via a multimodal route.

By way of example, the routing platform 105 may be implemented as a cloud based service, hosted solution or the like for performing the above described functions. Alternatively, the routing platform 105 may be directly integrated for processing data generated and/or provided by service platform 109, content providers 115, and/or applications 111. Per this integration, the routing platform 105 may perform candidate routes calculation based on user/vehicle trajectory information and/or public transport information.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the vehicles 103, the routing platform 105, the service platform 109, and the content providers 115 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
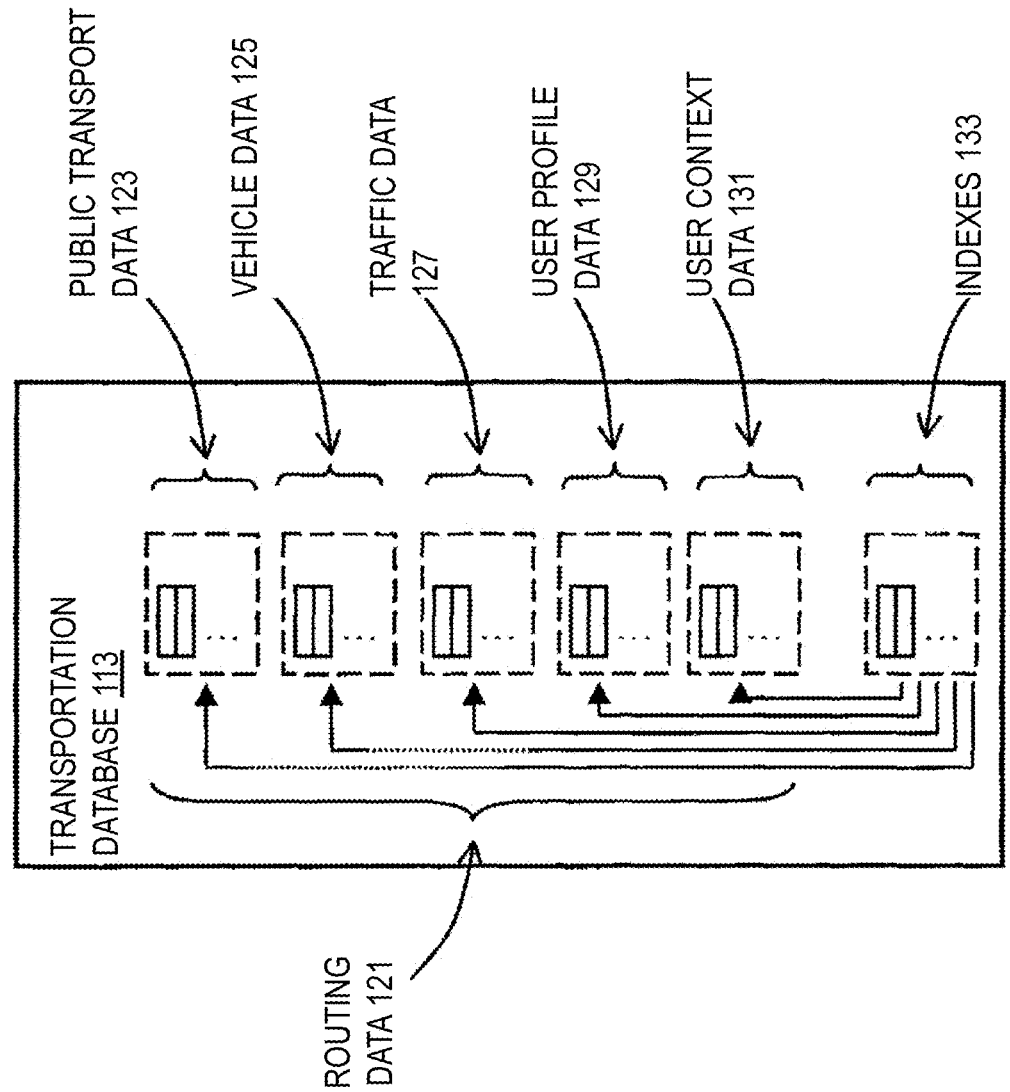
FIG. 1B is a diagram of a transportation database, according to one embodiment.

FIG. 1B is a diagram of the transportation database 113, according to one embodiment. In one embodiment, vehicle information and/or any other information used or generated by the system 100 with respect to provide drop-off locations for passengers of a vehicle to reach different destinations via a multimodal route based on routing data 121 stored in the transportation database 113 and associated with and/or linked to the geographic database 119 or data thereof.

In one embodiment, the routing data 121 include public transport data 123, vehicle data 125, traffic data 127, user profile data 129, user context data 131, indexes 133, etc. In one embodiment, the public transport data 123 can include any public transport data item used by the routing platform 105 including, but not limited to public transport type data, public transport schedule data, public transport route and stop data, real-time public transport trajectory data, etc. retrieved from transit agencies, public transportation operators, etc. In one embodiment, the public transport data can be used in junction with the user profile data 129 and the user context data 131 for determining a navigation route, generating one or more intermodal route legs for the passengers, estimating an estimated arrival time for the vehicle to arrive at a passenger drop-off location, and making modes of transport reservations for the passengers on the intermodal route legs to reach the destinations. In another embodiment, the traffic data 127 is further included for determining a navigation route, generating one or more intermodal route legs for the passengers, estimating an estimated arrival time for the vehicle to arrive at a passenger drop-off location, and making modes of transport reservations for the passengers on the intermodal route legs to reach the destinations. The public transport data format may be in General Transit Feed Specification (GTFS), GTFS real-time extensions, REST/XML, or other industry standards for publishing transportation network and schedule data. In one embodiment, the public transport can include but is not limited to on-demand services (e.g., taxis, shared vehicles, etc.) and fixed-route services such as city buses, trolleybuses, trams (or light rail) and passenger trains, rapid transit (metro/subway/underground, etc.), ferries, airlines, coaches, intercity rail, etc.

In one embodiment, the vehicle data 125 can include any vehicle data item used by the routing platform 105 including, but not limited to vehicle type data, vehicle ownership data, vehicle route and step data, real-time vehicle trajectory data, parking instance data, timestamp information for the parking instance data, etc. for determining a navigation route, generating one or more intermodal route legs for the passengers, estimating an estimated arrival time for the vehicle to arrive at a passenger drop-off location, and making modes of transport reservations for the passengers on the intermodal route legs to reach the destinations. In another embodiment, the traffic data 127 is further included for determining a navigation route, generating one or more intermodal route legs for the passengers, estimating an estimated arrival time for the vehicle to arrive at a passenger drop-off location, and making modes of transport reservations for the passengers on the intermodal route legs to reach the destinations.

In one embodiment, the traffic data 127 includes, but not limited to, travel speeds, congestions, detours, vehicle types and volumes, accidents, road conditions, road works, etc. on specific road segments.

In one embodiment, the user profile data 129 includes, but not limited to, the name, name, login named, screen named, nicknamed, handle names, home addresses, email addresses, government identification numbers, operator license/credential types (motorcycle, regular passenger vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/records, criminal records, purchase records, financial data, activity records, employment records, insurance records, medical records, political and non-political affiliations, preferences (e.g., POIs), calendar data, driving history data, vehicle sharing data, etc. of the user.

In one embodiment, the user context data 131 includes, but not limited to, a destination of the user, a type of the destination of the user, a proximity of the user destination to a passenger drop-off location, availability of an alternate mode of transport for the passenger, an alcohol level of the passenger, a number of passengers in the vehicle, weather data in the vicinity of the drop-off locations and the destinations, etc.

More, fewer or different data records can be provided in the transportation database 113. One or more portions, components, areas, layers, features, text, and/or symbols of the routing data records in the transportation database 113 can be stored in, linked to, and/or associated with one or more of the data records of the geographic database 119 (such as mapping and/or navigation data).

In one embodiment, the geographic database 119 includes geographic data used for (or configured to be compiled to be used for mapping and/or navigation-related services, such as for route information, service information, estimated time of arrival information, location sharing information, speed sharing information, and/or geospatial information sharing, according to exemplary embodiments. For example, the geographic database 119 includes node data records, road segment or link data records, POI data records, parking availability data records, and other data records.

In exemplary embodiments, the road segment data records are links or segments representing roads, streets, or paths, as can be used in the calculated route or recorded route information. The node data records are end points corresponding to the respective links or segments of the road segment data records. The road link data records and the node data records represent a road network, such as used by vehicles, cars, and/or other entities. Alternatively, the geographic database 119 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 119 can include data about the POIs and their respective locations in the POI data records. The geographic database 119 can also include data about places, such as cities, towns, or other communities, and other geographic features, such as bodies of water, mountain ranges, etc.

The transportation database 113 and/or the geographic database 119 can be maintained by the content provider in association with the service platform 109 (e.g., a map developer). The map developer can collect driving/parking data and geographic data to generate and enhance the transportation database 113 and/or the geographic database 119. There can be different ways used by the map developer to collect data. These ways can include obtaining data from other sources, such as municipalities or respective geographic authorities.

The transportation database 113 and/or the geographic database 119 can be stored in a format that facilitates updating, maintenance, and development of the relevant data. For example, the data in the transportation database 113 and/or the geographic database 119 can be stored in an Oracle spatial format or other spatial format. The Oracle spatial format can be compiled into a delivery format, such as a geographic data files (GDF) format to be compiled or further compiled to form geographic database products or databases, which can be used in end user navigation devices or systems.

As mentioned above, the transportation database 113 and the geographic database 119 are separated databases, but in alternate embodiments, the transportation database 113 and the geographic database 119 are combined into one database that can be used in or with end user devices (e.g., UEs 101) to provide navigation-related functions and provide shared vehicle information. For example, the databases 113, 119 are assessible to the UE 101 directly or via the routing platform 105. In another embodiments, the databases 113, 119 can be downloaded or stored on UE 101, such as in applications 111.

Figure 2:
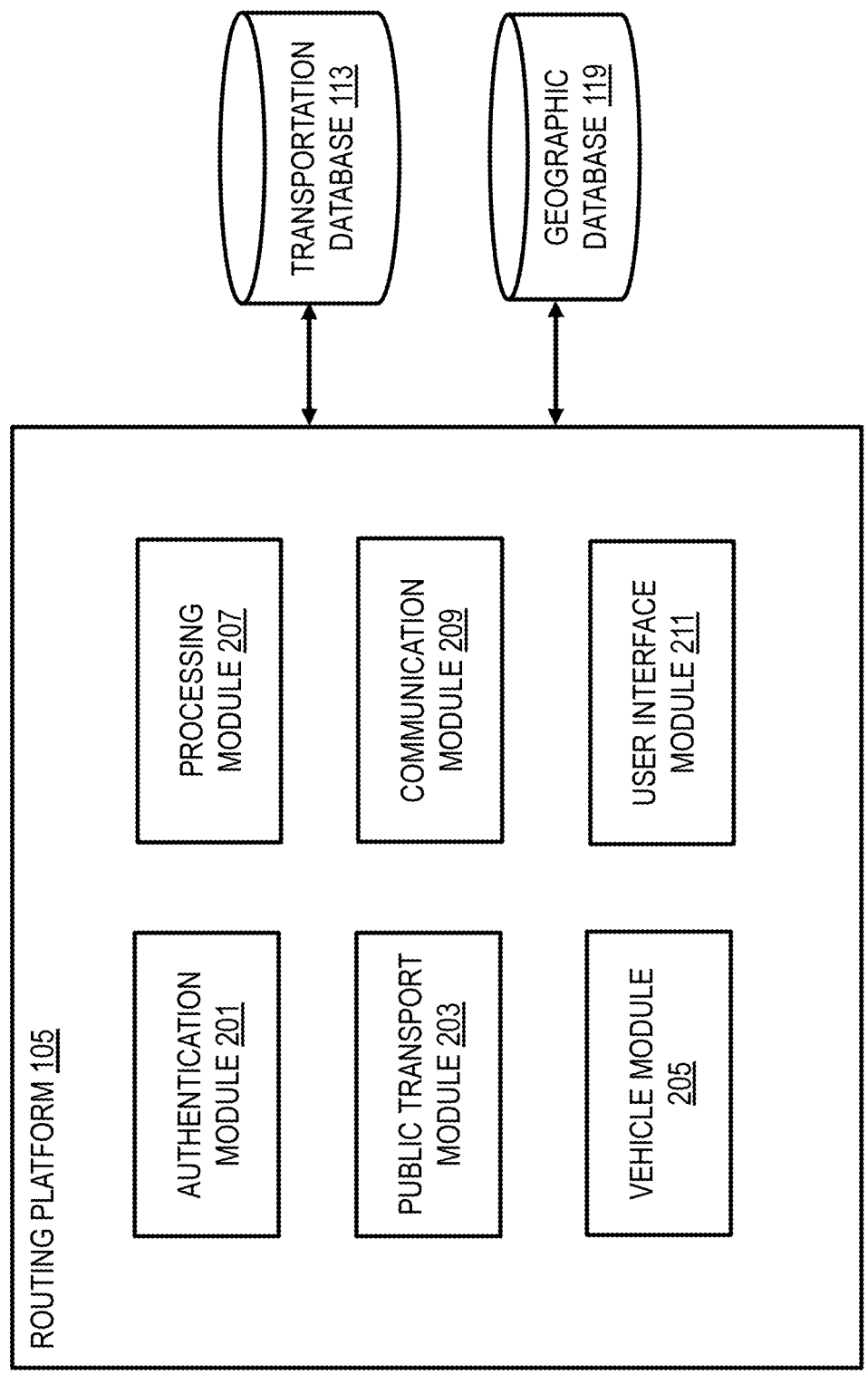
FIG. 2 is a diagram of the components of a routing platform, according to one embodiment.

FIG. 2 is a diagram of the components of a routing platform, according to one embodiment. By way of example, the routing platform 105 includes one or more components for providing drop-off locations for passengers of a vehicle to reach different destinations via a multimodal route. It is contemplated that the functions of these components may be combined or performed by other components of equivalent functionality. In this embodiment, the routing platform 105 includes an authentication module 201, a public transport module 203, a vehicle module 205, a processing module 207, a communication module 209, and a user interface module 211.

In one embodiment, the authentication module 201 authenticates UEs 101 and/or associated vehicles 103 for interaction with the routing platform 105. By way of example, the authentication module 201 receives a request to access the routing platform 105 via an application 111. The request may be submitted to the authentication module 201 via the communication module 209, which enables an interface between the application 111 and the platform 105. In addition, the authentication module 201 may provide and/or validate access by the UE 101 to upload trajectory data, and/or other location-based information to the platform 105. In one embodiment, the authentication module 201 may further be configured to support and/or validate the formation of profile by a provider of a service 109 or content provider 115, e.g., for supporting integration of the capabilities for providing drop-off locations for passengers of a vehicle to reach different destinations via a multimodal route with said providers 115 or services 109.

The public transport module 203 retrieves the public transport data 123 (including fixed-route and/or on-demand public transports and associated schedules and timestamps) from various sources such as the transportation database 113, transit agencies, public transportation operators, etc. In one embodiment, the public transport module 203 aggregates schedules of various public transport that are operated on fixed schedules. In another embodiment, the public transport module 203 analyzes trajectory data (including associated timestamps) uploaded by one or more authenticated public transport passenger UE 101 and/or various public transport (e.g., demand-responsive transit, such as flexible routing and/or flexible scheduling minibuses) to determine the status of the transports that operate on demand. In one embodiment, the public transport module 203 may receive other related data along with the trajectory data or segment lists such as acceleration, road curvature, vehicle tilt, driving mode, brake pressure, etc. It then stores the received data to database 113 optionally in association with a unique identifier of the various public transport that transmitted the trajectory data.

The vehicle module 205 collects and/or analyzes trajectory data (including associated timestamps) as generated by one or more authenticated UE 101 and one or more vehicles 103. For example, the vehicle module 205 aggregates the trajectory data of travel segments generated by the UE 101 and the one or more vehicles 103. In one embodiment, the vehicle module 205 may receive other related data along with the trajectory data or segment lists such as acceleration, road curvature, vehicle tilt, driving mode, brake pressure, etc. It then stores the received data to database 113 optionally in association with a unique identifier of the vehicle, driver of UE 101 that transmitted the trajectory data or lists.

In one embodiment, the processing module 207 determines a given set of passengers joining a driver of a vehicle, computes an optimal navigation route for all riders in the vehicles, based on multi-point intermodal route computations to be explained in connection with FIGS. 3-5. In another embodiment, the processing module 207 selects passengers among a wider group of people (e.g., at an event), which to ride in the vehicle based on a corridor related to the driver's route and the multi-points intermodal routes computations, to be explained in connection with FIG. 6.

The processing module 207 may execute an algorithm to determine the availability of the modes of transport and the feasibility and/or availability of a candidate drop-off location relative to restrictions, requirements, transport schedules, lane regulations and other information as maintained by transportation databases 113.

The processing module 207 may process user profile data, user context data, contextual information associated with candidate drop-off locations to determine a drop-off location. As such, contextual information may be used to further filter and/or refine an initial set of candidate drop-off locations for a given passenger. Hence, an initial set of candidate drop-off locations may be refined to determine one or more drop-off locations. For the purpose of illustration, the drop-off location contextual information may include parking information, traffic information, traffic light information, public transport schedule information, modes of transport availability information, environmental condition information, obstruction information, or a combination thereof. The user context data may include a number of passengers to drop off at one location, physical capability information of the passenger, luggage information, etc. As noted previously, such context information is acquired by way of the services 109 including location based services and navigation services, sensors of the UE 101 and/or vehicle, data compiled per databases 113, 119, or a combination thereof.

The processing module 207 may also operate in connection with the application 111 to determine the geographic or temporal context or situation of a UE 101. This includes receiving relevant information from the various sensors 101 of the UE 101 for determining vehicular, user or environmental conditions as well as utilizing location-based data to determine current location (e.g., geographic coordinates) and temporal information (e.g., speed) regarding a UE 101. The processing module 207 may also identify whether certain conditions or triggers have been met, such as whether a particular event has occurred, such as whether a reserved mode of transport has reached the drop-off location. The processing module 207 also determines the drop-off locations, one or more points of interest, or a combination thereof. Further, the processing module 207 may determine to store the drop-off locations associated with the points of interest in connection with the profile of the user. In addition, this information may be stored to the location databases 113 for enabling continual learning and refining of the determination capacity of the routing platform 105 as well as stored to the databases 113, 119 for supporting sharing of the information with other users.

The processing module 207 analyzes the contextual information to determine one or more restrictions that distinguish one or more drop-off locations from one or more modes of transport hubs and/or parking locations. The drop-off locations may correspond to given points of interest whereas the modes of transport are available. The processing module 207 also determines the one or more candidate drop-off locations from the points of interest. By way of example, the one or more restrictions may include, at least in part, one or more parking restrictions, one or more lane restrictions, or a combination thereof.

In one embodiment, the processing module 207 computes a cost function score for a navigation route including the candidate drop-off locations. In other embodiments, the processing module 207 computes a cost function score for a navigation route including drop-off locations filtered as discussed above.

By way of example, the processing module 207 computes a cost function score by comparing a plurality of features of respective drop-off locations to the plurality of features of the other modes of transport to determine a number of common features (n) shared between the plurality of features of the respective drop-off locations and the plurality of features of the other modes of transport, and calculating the cost function score using an equation including a weighting vector (w), the other mode of transport feature vector (r), a respective drop-off location feature vector (p):

$$\cos t(r, p) = \sum_{i=1->n} w_i r_i p_i$$

where i=1 to the number of common features shared between other mode of transport and the drop-off location feature vectors.

In one embodiment, the mode of transport features include a mode of transport type (e.g., cars, motorcycles, electric bikes, electric scooters, bicycles, boats, airplanes, etc.), a mode of transport model, relevant reservation criteria (e.g., a reservation fee, a reservation time length, a number of concurrent reservation limit, etc.), usage cost (e.g., rental fee per minute, per 30 minutes, per hour, per day, per week, per month, etc.), promotions (e.g., the first 30 minutes free for a new user, a bonus if returning to the drop-off location or preferred locations, premium customers can re-book more times than standard users or for a longer period, etc.), dropping off criteria (e.g., distance, location, area limitations), the vehicle drop-off location with respect to a riding location of the alternate mode of transport, the route to the final destination of the passenger, alternative drop-off locations, user preferences, consumer ratings of the mode of transport and/or operator, predictive and/or live traffic near the user destination, scheduling of the alternate mode of transport, etc.

In one embodiment, the processing module 207 manages mode of transport reservations used in an intermodal route that includes a route taken by the vehicle and one or more intermodal route legs to be taken by passengers at drop-off locations. For example, the processing module 207 makes mode of transport reservations for passengers to be dropped-off and then travel the one or more intermodal route legs to their respective destinations. The processing module 207 monitors an expiration period of the mode of transport reservation and a passenger location in the vehicle based on real-time trajectory data. In another embodiment, the processing module 207 calculates a probability that estimates the vehicle location and re-books the mode of transport considering any early arrival or delay.

Probability is the measure of how likely an event is to occur out of the number of possible outcomes. To simplify the selection of passengers among a wider group of people (e.g., at an event), the processing module 207 selects passengers to ride in the vehicle based on a corridor related to the driver's route to be explained in connection with FIG. 6.

The above-discussed embodiments refer to passenger drop-off for car-sharing as examples, in the context of centralized ride-sharing, peer-to-peer ride-sharing, car-pooling, taxi cabs, food delivery, etc. By analogy, these embodiments are also applicable to picking up passengers from different locations then riding to the same destination.

In addition to passengers, the above-discussed embodiments are applicable to cargo dispatching, including a main/bigger vehicle with smaller robots on-board (or drones) which may benefit from considering the capabilities and attributes from each robot to find the navigation route with locations to drop them off and later to get them back.

In one embodiment, once the navigation route is determined, the processing module 207 can interact with the communication module 209 and/or the user interface module 211 to present to the user the navigation route. After the user selects the navigation route, the processing module 207 can interact with the communication module 209 and/or the user interface module 211 to present to the user drop-off locations, alternate modes of transport reservations and timing information, related navigation instructions, and/or other information related to the alternate modes of transport.

The processing module 207 provides the user data of the alternate modes of transport (e.g., mode of transport type, model, fees, operation limits, etc.), and optionally timing information. In one embodiment, the processing module 207 provides to the user navigation instructions, and/or other information to the user to locate the alternate mode of transport.

Since there can be delays caused by predictive and/or live traffic, weather, etc. for the user, the processing module 207 updates the vehicle location, the alternate mode of transport locations, or a combination thereof based on data from the transportation database 113 that is obtained via real-time monitoring by the system 100. In one embodiment, the processing module 207 updates the probability calculation and the cost function scores based on the updated vehicle location and/or alternate mode of transport locations and updates the drop-off timing and the alternate mode of transport reservations, or even the navigation route as necessary.

It is further noted that the user interface module 211 may operate in connection with the communication module 209 to facilitate the exchange of real-time location information and/or alternate mode of transport information via the communication network 107 with respect to the services 109, content providers 115 and applications 111. Alternatively, the communication module 209 may facilitate transmission of the real-time location information and/or the alternate mode of transport information directly to the services 109 or content providers 115.

The above presented modules and components of the routing platform 105 can be implemented in hardware, firmware, software, or a combination thereof. Though depicted as a separate entity in FIG. 1A, it is contemplated that the platform 105 may be implemented for direct operation by respective UEs 101 and/or vehicles 103. As such, the routing platform 105 may generate direct signal inputs by way of the operating system of the UE 101 and/or vehicles 103 for interacting with the application 111. In another embodiment, one or more of the modules 201-211 may be implemented for operation by respective UEs 101 and/or vehicles 103*as* a platform 105, cloud based service, or combination thereof.

Figure 3:
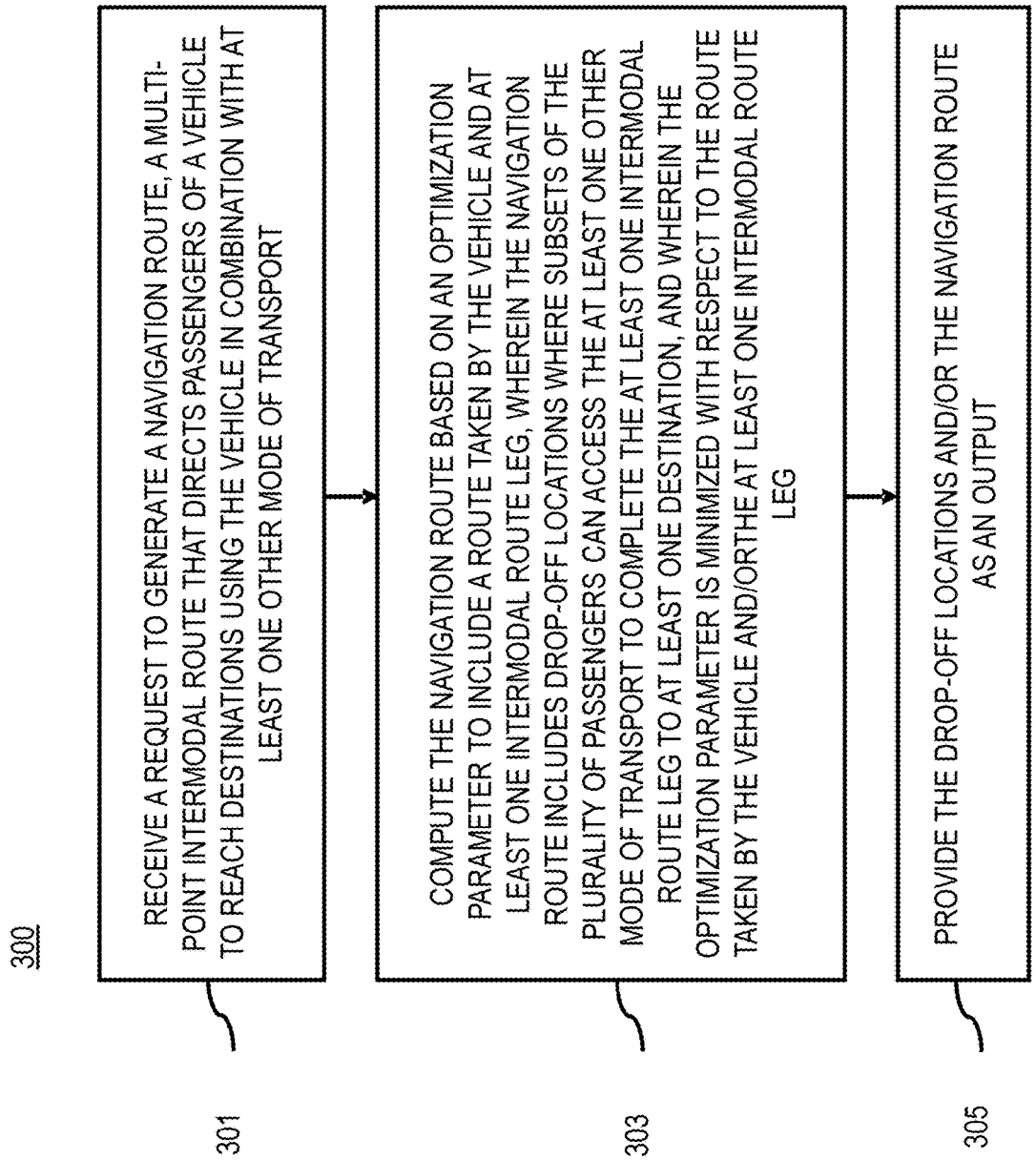
FIG. 3 is a flowchart of a process for providing drop-off locations for passengers of a vehicle to reach different destinations via a multimodal route, according to one embodiment.
Figure 9:
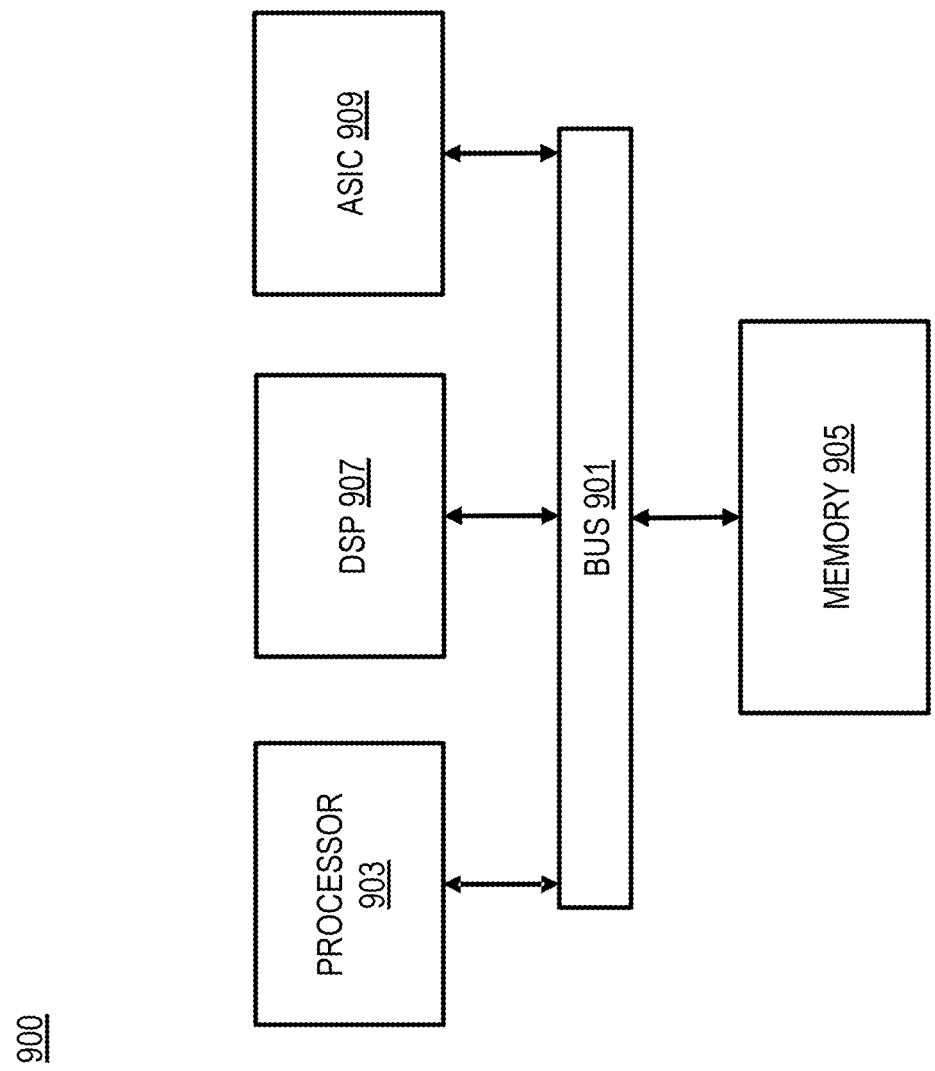
FIG. 9 is a diagram of a chip set that can be used to implement an embodiment of the invention.

FIG. 3 is a flowchart of a process for providing drop-off locations for passengers of a vehicle to reach different destinations via a multimodal route, according to one embodiment. In one embodiment, the routing platform 105 performs the process 300 and is implemented in, for instance, a chip set including a processor and a memory as shown in FIG. 9. In addition or alternatively, all or a portion of the process 300 may be performed locally at the UE 101 and/or vehicle 103 (e.g., via the application 111 or another equivalent hardware and/or software component).

FIGS. 4A-4D are diagrams of user interfaces showing a navigation route including a route taken by a vehicle and intermodal route legs, according to various embodiments. In step 301, the routing platform 105 receives a request to generate a navigation route. By way of example, User A is driving passengers B-E "towards" their homes and requests the system for the best locations where to drop them off so they can conveniently reach their homes.

Figure 4A:
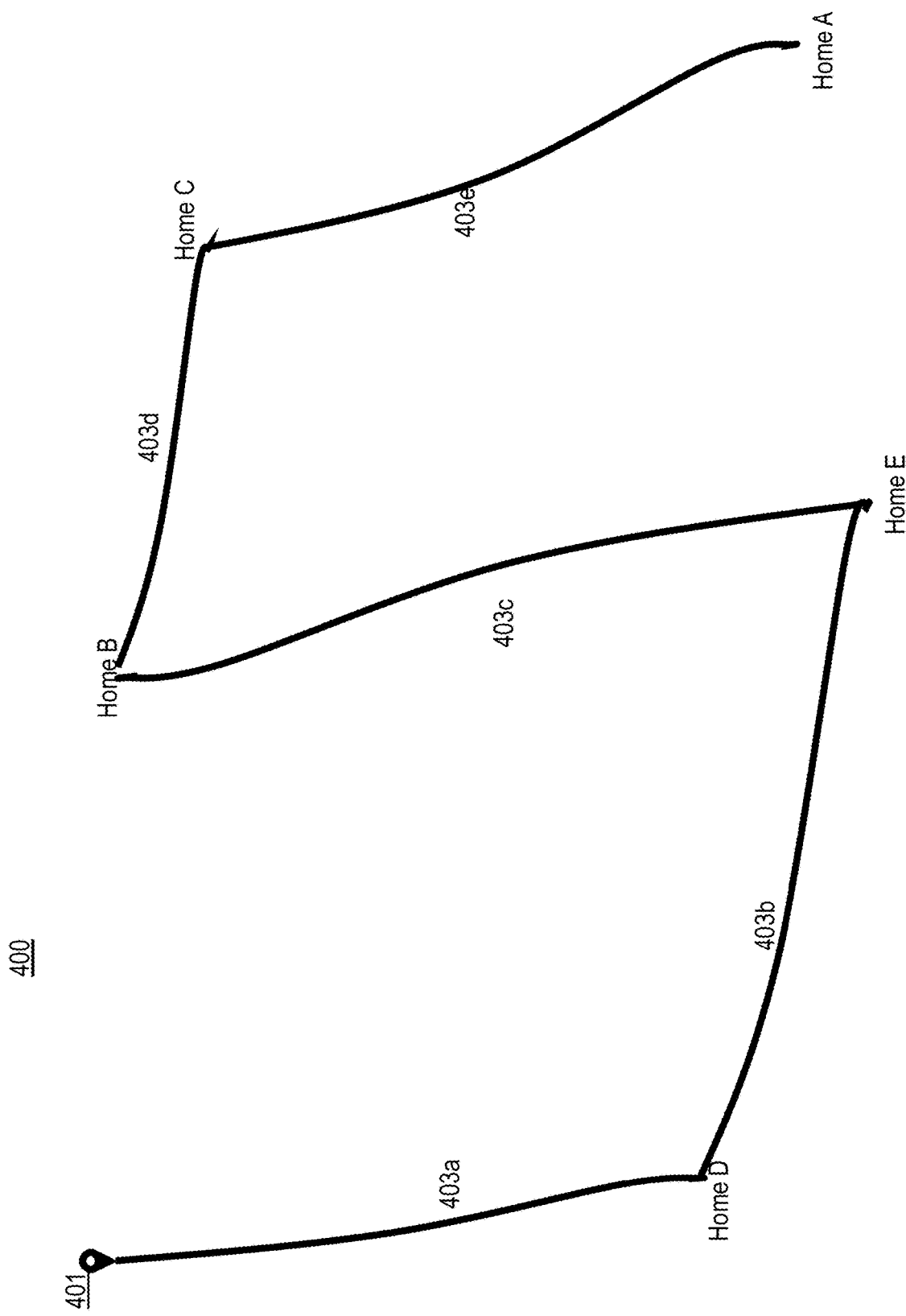

In response to the request, the routing platform 105 determines a given set of passengers B, C, D, E joining a driver A of a vehicle to ride homes after a party from a location 401 shown in the user interface (UI) 400 of FIG. 4A. Instead of dropping off the passengers B-E door-to-door FIG. 4A using the road segments 403a-403e, the routing platform 105 computes a multi-point intermodal navigation route that directs the plurality of passengers A-E to reach a plurality of destinations (e.g., Homes A-E) using the vehicle in combination with at least one other mode of transport. In this example, the Homes A-E are different for each passenger. In another example, some passengers may live at the same house (e.g., A and B are a couple), such that the destinations are different for one or more subsets of the plurality of passengers. In one embodiment, the at least one other mode of transport may include a public transport, a shared vehicle, a taxi, a ride-hailing service, or a combination thereof.

In step 303, the routing platform 105 computes the navigation route based on an optimization parameter to include a route taken by the vehicle and at least one intermodal route leg, wherein the navigation route includes one or more drop-off locations where the one or more subsets of the plurality of passengers can access the at least one other mode of transport to complete the at least one intermodal route leg to at least one destination of the destinations. The navigation route allows the driver A to bring passengers B-E closer to their respective destinations (e.g., Homes B-E) from optimal drop-off locations by considering all mode of transport options available to those passengers, including shared vehicles. A shared vehicle may be a car, a motorcycle, an electric bike, an electric scooter, a bicycle, a kickboard, a mini scooter, a boat, etc. owned by an individual, a commercial business, a public agency, a cooperative, or an ad hoc grouping.

In one emblement, the routing platform 105 asks for the driver's preference on what to "optimize for" the navigation route. The optimization parameter may be minimized with respect to the route taken by the vehicle, the at least one intermodal route leg, or a combination thereof. In step 305, the routing platform 105 provides the one or more drop-off locations, the navigation route, or a combination thereof as an output.

In one embodiment, the routing platform 105 optimizes the navigation route based on a total travel time or a total travel distance for the route taken by the vehicle, a least amount of detour for the route taken by the vehicle, wherein the detour is determined with respect to a respective destination of the destinations that is associated with the vehicle. In another embodiment, the routing platform 105 optimizes the navigation route based on a number of the one or more drop-off locations.

Figure 4B:
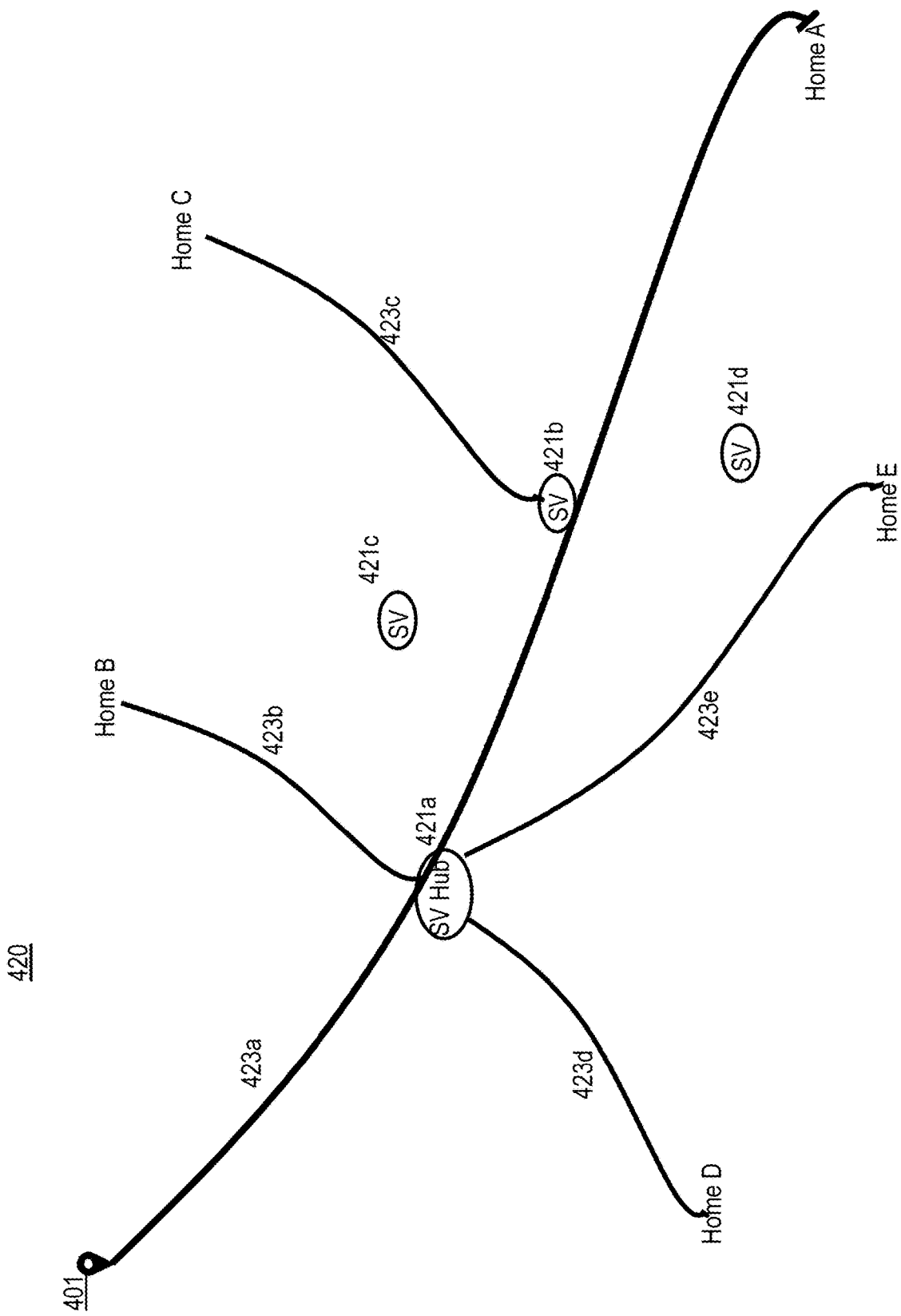
Figure 4C:
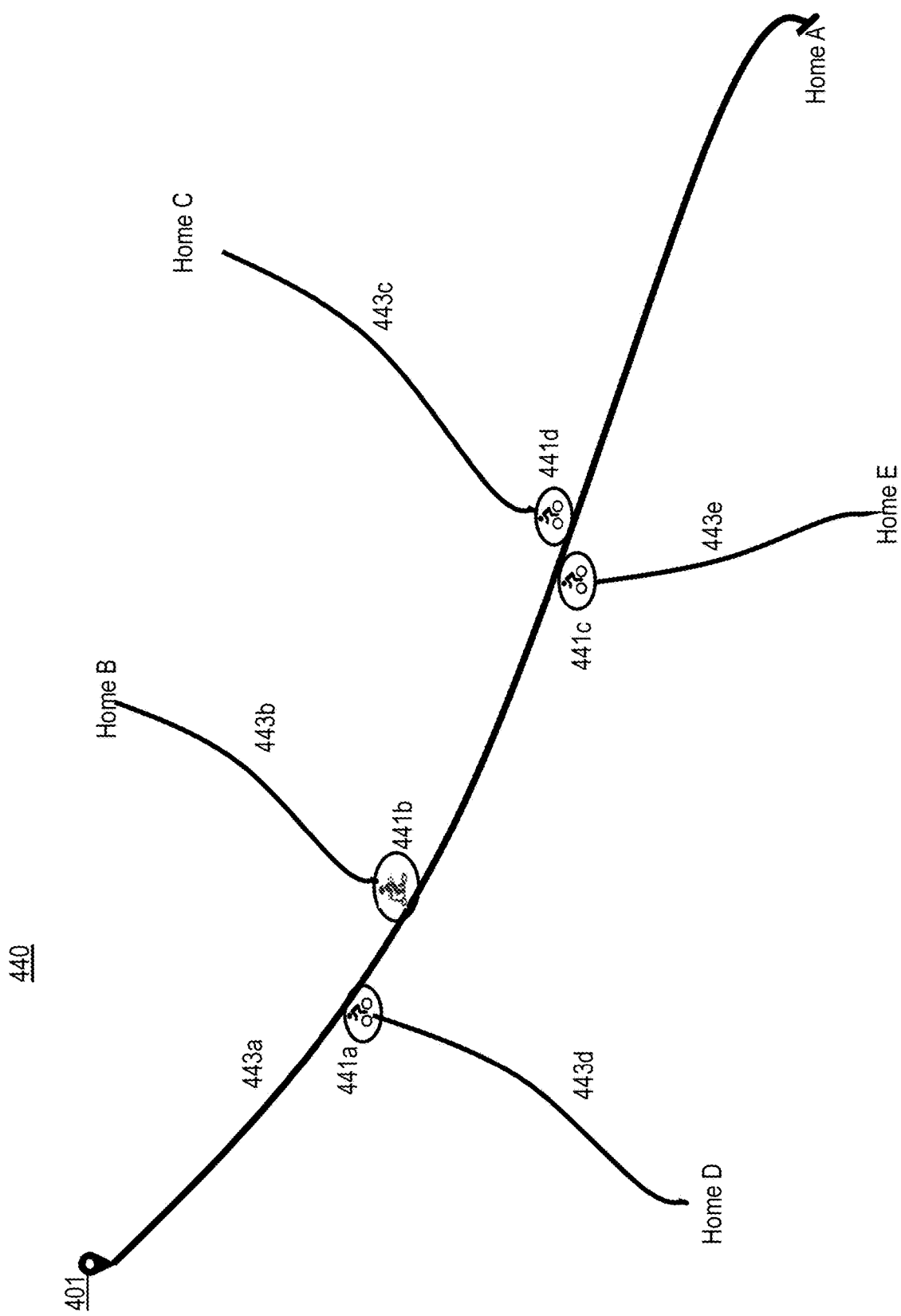

By way of example, in the user interface 420 of FIG. 4B, the navigation route is optimized to minimize detours and the number of stops for the driver, thus favoring shared vehicles hubs where passengers will be able to find a vehicle to continue their journey. The routing platform 105 suggests two drop-off locations 421a, 421b among the locations 421a-421d where either public transport or shared vehicles will be available, and proactively reserves respective modes of transport for the passengers at the drop-off locations to the destinations once the user or users accept the suggestion. In one emblement, the routing platform 105 finds a mobility hub where two or more passengers could be dropped off to reduce the number of drop offs. As results, passengers B, D, E are to be dropped off at a shared vehicle hub 421a, then take reserved shared vehicles back to Homes B, D, E via intermodal route legs 423b, 423d, 423e respectively, and passenger C is to be dropped off at a shared vehicle location 421b, then take a reserved shared vehicle back to Home C via an intermodal route leg 423c, along the road 423a before the vehicle reaching the driver A's Home A.

In one embodiment, the routing platform 105 optimizes the navigation route based on a travel time or a travel distance for the one or more subsets of the plurality of passengers. In another embodiment, the routing platform 105 optimizes the navigation route based on a total travel time or a total travel distance for all of the plurality of passengers. By way of example, the routing platform 105 optimizes the navigation route based on a travel time for a given passenger, such as a pregnant woman, a young person, a VIP, etc.

In on embodiment, the driver A responses to the routing platform 105 to minimize the "overall time" for all participants to go home (i.e. the sum of all travel times of all users). In the user interface 440 of FIG. 4C, the navigation route is optimized to favor the total travel time of all participants, by taking the speed gain favoring a shared scooter over bikes as well as dropping off each passenger to each own optimal mode of transport location. The routing platform 105 suggests four drop-off locations 441a-441d where shared vehicles will be available, and proactively reserves respective modes of transport for the passengers at the drop-off locations to the destinations once the user or users accept the suggestion. In the case, each of the passengers B, C, D, E is to be dropped off at a respective shared vehicle location 441a, 441b, 441c, 441d, then take a respective reserved shared vehicle (e.g., either a scooter or a bike) back to Homes B, C, D, E via intermodal route legs 443a, 443b, 443c, 443d respectively, along the road 443a before the vehicle reaching the driver A's Home A. In this example, there are more bikes available than scooters, which may be a result of the late evening time when more scooters were taken by other riders to their homes thus less available on the navigation route and the nearby areas.

In one embodiment, the routing platform 105 optimizes the navigation route based on an arrival time of a last passenger of the plurality of passengers at a last destination of the destinations, such as to make sure nobody gets home one hour after the rest of passengers.

The above-discussed embodiments assume the driver A is using the driver's own car, the driver drives until the driver's own destination, and the routing platform 105 may consider the time to park at the driver's destination (e.g., a community parking lot, the driver's own parking lot, etc.) in the overall computation, depending on the optimization function being selected. As discussed, the routing platform 105 further considers the constraints related to the driver's vehicle such as a fuel level, autonomous driving or not, ability to enter certain areas (e.g., like diesel-banned areas), etc. Constraints related to finding a parking spot may become obsolete if the car is an autonomous vehicle that can drive and park itself somewhere else.

In another embodiment, when the main driver is using a shared car (such as an autonomous rental vehicle, taxi-robot, etc.), the routing platform 105 further considers the restrictions of this shared vehicle, such as a service area, a charging level, areas where to leave the car, a price for the rental, etc. For example, it may make sense to drop the car earlier and let some people bicycle a bit more, when the shared vehicle costs a lot while the system is trying to optimize the overall journey cost.

In one embodiment, the routing platform 105 monitors a shared vehicle density/availability at each of the drop-off locations (e.g., mobility hubs), and determines that the share vehicle density/availability at a drop-off location X drops below a threshold, i.e., a risk of not having shared vehicles at the drop-off location X if going later). The routing platform 105 thus arranges a special detour to reach the drop-off location X before a drop-off location W that was scheduled to reach prior to the drop-off location X.

In another embodiment, the routing platform 105 monitors the alternate mode of transport reservations at the drop-off locations in real-time, and re-books any reservations as necessary. The reservation expiration at drop-off location Y may be caused by unforeseeable events, such as a traffic accident. However, when re-booking an alternate mode of transport is impossible or unsuccessful for the drop-off location Y, the routing platform 105 arranges a special detour to reach the drop-off location Y first before the relevant alternate mode of transport reservation expires (e.g., is about to expire in 5 minutes).

By way of example, in the user interface 460 of FIG. 4D, the driver A and passenger C live outside the operating area of the shared car being used by the driver. Hence the car needs to be dropped inside the service area of the vehicle, at a convenient location where shared vehicles are available. The routing platform 105 suggests two drop-off locations 461a, 461b where either public transport or shared vehicles will be available, and proactively reserves respective modes of transport for the passengers at the drop-off locations to the destinations once the user or users accept the suggestion. In the case, passengers B, D, E are to be dropped off at a shared vehicle hub 461a, then take reserved shared vehicles back to Homes B, D, E via intermodal route legs 463a, 463b, 463c respectively, and driver A and passenger C is to get off at a parking lot 461b at the edge of a service area 465 of the respective mobility operator of the vehicle, then take reserved shared vehicles back to Homes A, C via intermodal route legs 467a, 467b respectively.

Since the group starts with a shared vehicle, the routing platform 105 optimizes the navigation route via switching to one or more other vehicles available on the way, to reduce cost (e.g., distance, time, fees, etc.). By way of example, after dropping off passengers B, D, E at the shared vehicle hub 461a from a van (which can take up to 8-10 people), driver A and passenger C switches to a compact car or motorcycle. The compact car or motorcycle can be either a shared vehicle proactively reserved by the routing platform 105, or a personal vehicle of the driver A or passenger C available at the shared vehicle hub 461a.

In another embodiment, the routing platform 105 optimizes the navigation route based on a total cost for completing the navigation route to all of the destinations for said all of the plurality of passengers, etc. By way of example, the routing platform 105 automatically decides the navigation route for the vehicle based on a cost function including routing cost function parameter such as distance, fuel efficiency, estimated time of arrival (ETA), a quality of drop-off location(s), etc. customized for the vehicle in combination with all alternate modes of transport. In one embodiment, the routing platform 105 computes car-pooling fees for passengers to pay for the ride based on not only a fuel cost, an ETA, etc., but also a quality of drop-off location(s) (including the total number of drop-off locations, and the types/numbers of available modes of transport, etc.). By way of example, the routing platform 105 considers it is more valuable to be dropped at a location where a passenger can continue with a shared bike/scooter/car rather than at a bus stop where the bus comes every 30 minutes.

In one embodiment, the routing platform 105 optimizes the navigation route based on a quality level of the at least one intermodal route leg to the least one destination, such as vehicle type, models, vehicle seat numbers, cruise control, etc. In another embodiment, the routing platform 105 optimizes the navigation route based on a safety level of the least one intermodal route leg to the least one destination, such as by avoiding letting a passenger travelling alone in a given area or with a specific mode of transport there, e.g., a bike or scooter at night.

In other embodiments, the routing platform 105 automatically decides the navigation route based on the cost function, user preferences (e.g., comfort, vehicle models, vehicle seat numbers, cruise control, etc.), and/or user context, etc. For example, such an optimum mode of transport that satisfies the passenger's criteria, such as available now, within 2-minute walking distance, and cost less than $5.

In one embodiment, the routing platform 105 determines the one or more drop-off locations, the at least one destination, at least one intermodal route leg, or a combination thereof based on a mobility graph associated with the one or more subsets of the plurality of passengers (e.g., learning user behaviors with respect to an area, the user's familiarity index with the area, etc.). In one embodiment, the routing platform 105 uses mobility graphs to determine the destinations of the various passengers. In another embodiment, the routing platform 105 uses mobility graphs to learn the preferred modes of transport (e.g., public transport, shared bike/scooter/car/roller), vehicle capabilities (e.g., load capability, cruise control, seat number), etc. for each passenger. In another embodiment, the routing platform 105 uses mobility graphs to determine the best route based on the passenger's familiarity index of different routes to the respective destination. When the routing platform 105 determines that a passenger is much more familiar in some areas than in others, it may decide to adapt the drop-off location in order to match this "known" area (to avoid leaving this passenger in an unfamiliar area) and make the journey more convenient and safe for the passenger.

Figure 5:
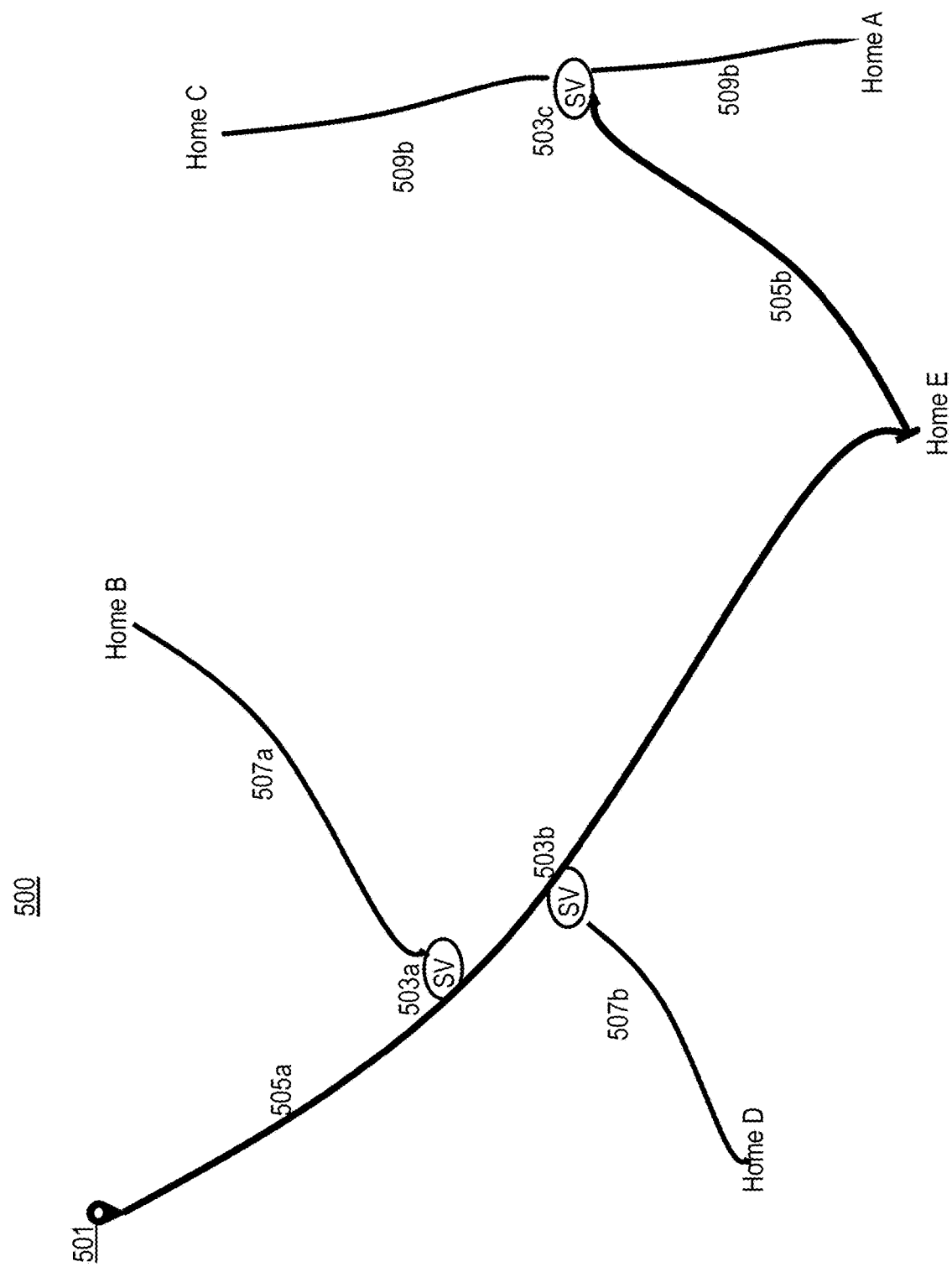
FIG. 5 is a diagram of a user interface showing a navigation route considering a service area of a vehicle, according to one embodiment.

FIG. 5 is a diagram of a user interface showing a navigation route considering a service area of a vehicle, according to one embodiment. In the user interface 500 of FIG. 5, the vehicle is a shared vehicle, and the navigation route includes a handover of the shared vehicle from a first passenger E of the plurality of passengers A-E to a second passenger A of the plurality of passengers. In this example, the route starts from a location 501, and the routing platform 105 suggests three drop-off locations 503a, 503b, 503c where either public transport or shared vehicles will be available, and proactively reserves respective modes of transport for the passengers at the drop-off locations to the destinations once the user or users accept the suggestion. The handover occurs on reaching a respective destination (e.g. Home E) of the first passenger E along a route 505a, the passenger E gets off then passenger A takes over the driving via road 505b to the last drop-off location 503c. In the case, passengers B, D are to be dropped off at shared vehicle locations 503a, 503b, then take reserved shared vehicles back to Homes B, D via intermodal route legs 507a, 507b respectively. Passengers A, C is to get off at the last drop-off location 503c, then take reserved shared vehicles back to Homes A, C via intermodal route legs 509a, 509b respectively.

Figure 6:
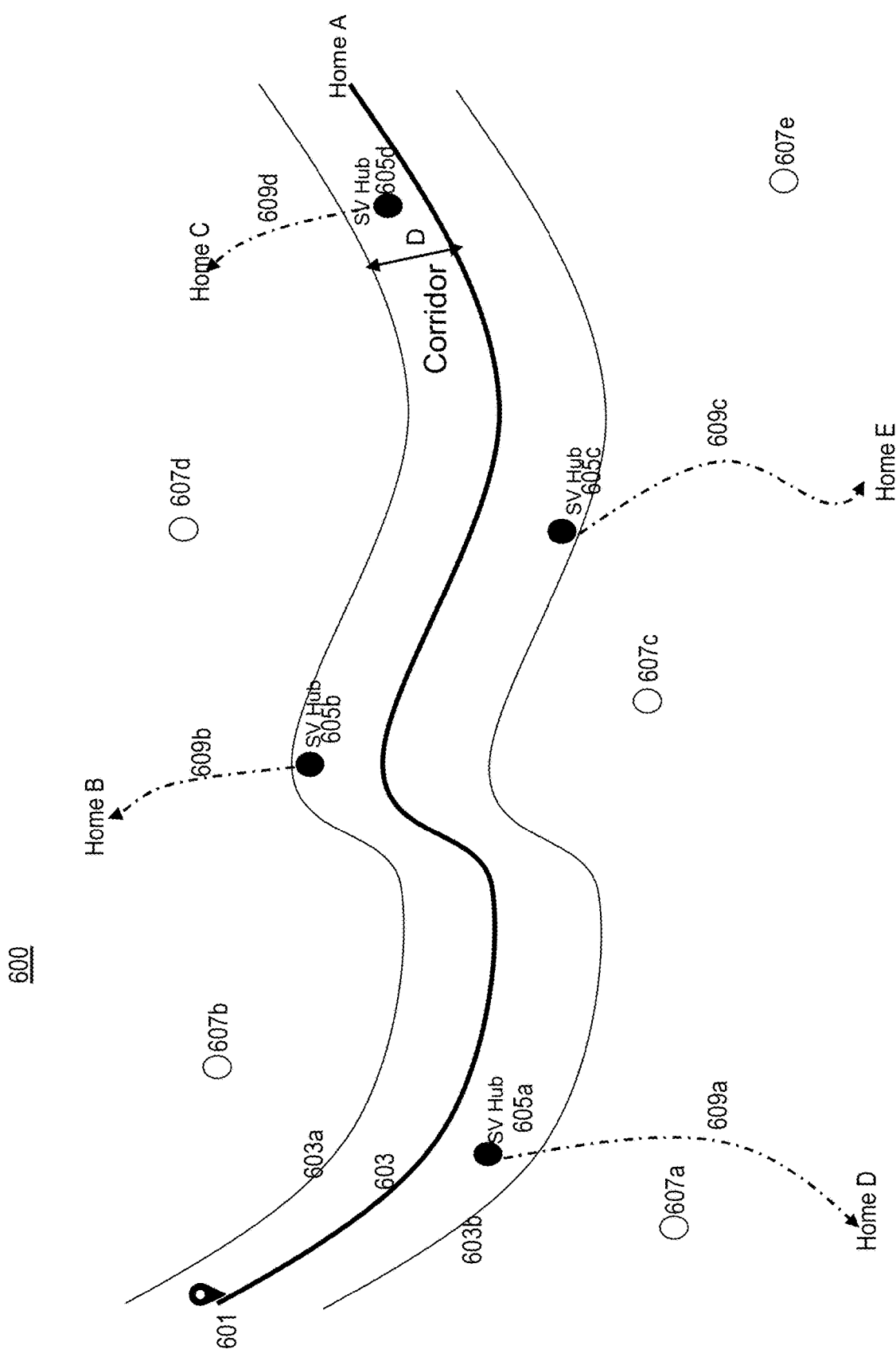
FIG. 6 is a diagram of a user interface used in the processes for providing drop-off locations for passengers of a vehicle to reach different destinations via a multimodal route, according to one embodiment.

FIG. 6 is a diagram of a user interface used in the processes for providing drop-off locations for passengers of a vehicle to reach different destinations via a multimodal route, according to one embodiment. In one embodiment, the processing module 207 selects passengers among a wider group of people (e.g., at an event), which to ride in the vehicle based on a corridor related to the driver's route and the multi-points intermodal routes computations computed based on the embodiments described in FIGS. 3-5.

The routing platform 105 computes an optimal route to a primary destination of the vehicle. The primary destination is the at least one destination associated with the one or more subsets of the plurality of passengers. In one embodiment, the primary destination associated with the driver A in FIG. 4B. In one embodiment, the primary destination associated with a main passenger, such as the passenger A then becoming the handover driver in FIG. 5.

In one embodiment, in order to find out which transport hubs need to be considered from a starting location 601, the routing platform 105 generates a corridor defined by boundaries around an optimal route. By way of example, the optimal route 603 is the shortest and/or fastest route for the driver A to reach the driver's destination Home A. In the user interface 600 of FIG. 6, the routing platform 105 determines a corridor defined by boundaries 603a, 603b representing a geographic area within a threshold distance along the optimal route 603. In this example, the corridor is computed based on a fix distance D from the optimal route 603 as shown in FIG. 6. In another embodiment, the corridor is computed based on an estimated arrival time (ETA) of +/−10 min driving from the optimal route, i.e., at most 10-minute detour from the optimal route, which can result in various distances from the optimal route, depending on the local route geometry and traffic conditions.

The routing platform 105 looks for transport hubs 605a, 605b, 605c, 605d which are located inside this corridor 603 (thus minimizing the detour for the driver and reducing the computation by not having to consider all transport hubs), and allow the passengers B, C, D, E to reach their destinations Homes B-E respectively, considering the limits of the service areas for the respective mobility provider. The routing platform 105 ignores transport hubs 607a-607e that are located outsides this corridor 603. In this case, drop-off locations are selected from transport hubs 605a, 605b, 605c, 605d falling within the corridor. Once the drop-off locations are established, the routing platform 105 establishes their links to the multiple destinations as intermodal route legs 609a-609d.

The routing platform 105 can apply the corridor in a similar scenario in a big party with 100 people including 20 people who have vehicles to bring the others closer to their final destinations by leaving them at transport hubs on their way home. The routing platform 105 has to decide which passengers should a driver take in a respective vehicle based on their respective destinations in order for each carpool to make sense without overly deviating from the optimal path for the driver. The routing platform 105 does a similar computation based on a distance or an ETA to define a corridor, transport hubs inside the corridor and their relations to the passengers' destinations. Based on this computation, the routing platform 105 groups the passengers with different drivers, then recommends the groupings.

Figure 7A:
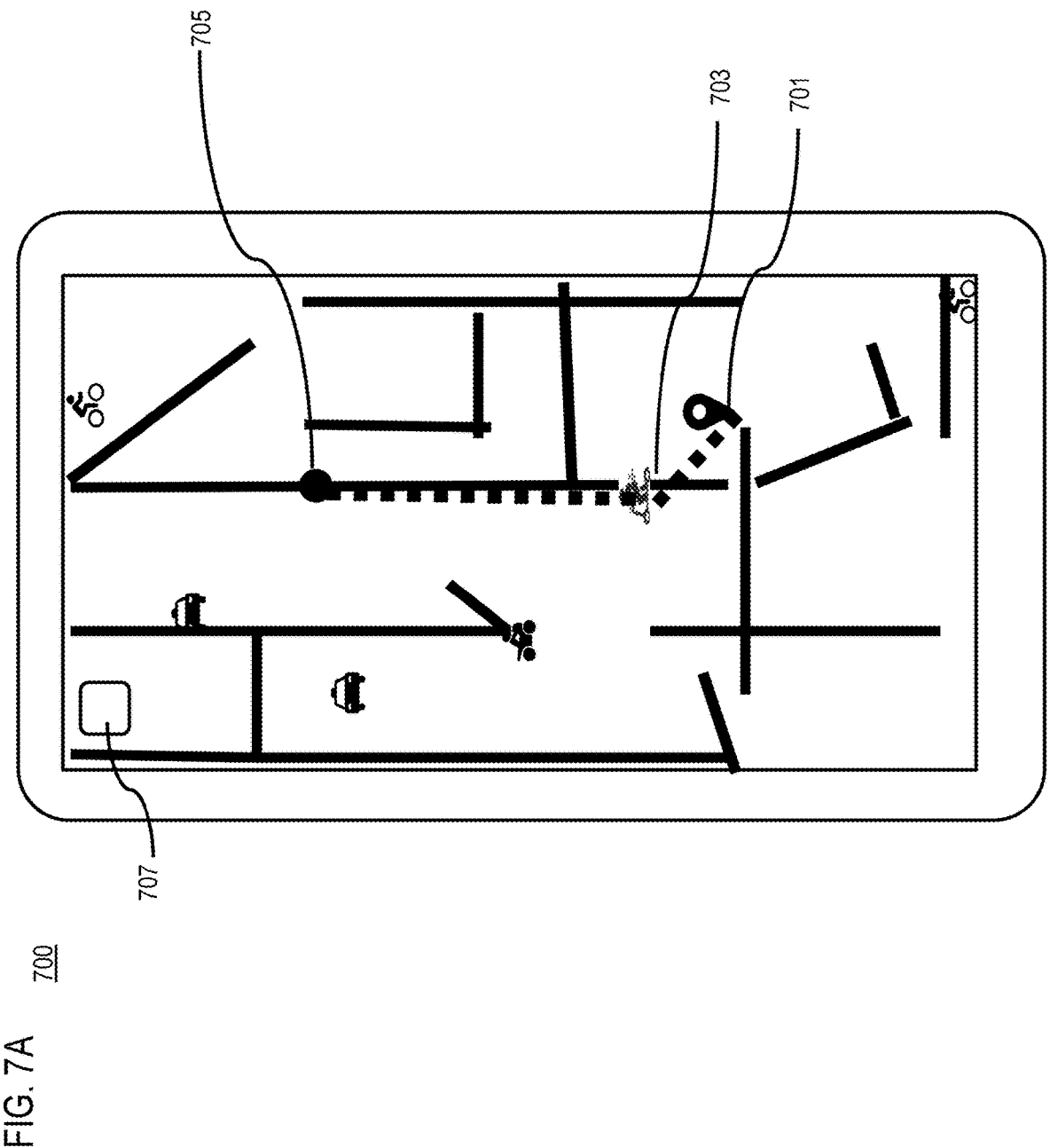

FIGS. 7A-7B are diagrams of user interfaces used in the processes for proactive booking of a shared vehicle for an intermodal route leg, according to various embodiments. More specifically, FIGS. 7A-7B illustrate user interfaces that can be used in real-time by UEs 101 participating in a routing service provided by the system 100. In one embodiment, the routing platform 105 initiates a reservation of an alternate mode of transport for a subset of the passengers to complete the intermodal route leg. In the user interface 700 of FIG. 7A, the routing platform 105 guides a passenger gets off at a drop-off location 701 to walk to a proactively reserved scooter 703 to ride to a destination 705. To simplify the discussion, FIG. 7A shows travel segments as straight lines instead of real-world road lines on a map.

When a presentation switch icon 707 is selected, the routing platform 105 switches the presentation among a two-dimensional user interface, a three-dimensional user interface, an augmented reality user interface, etc. FIG. 7B is a diagram of a user interface 720 used in the processes for guiding a passenger to a reserved shared vehicle, according to one embodiment. For example, upon the selection of the presentation switch icon 707 in FIG. 7A, the presentation switches from the two-dimensional user interface 700 into a three-dimensional user interface 720 augmented with an human graphic FIG. 721, which can be an photo of the user, an avatar with the user's look, an avatar of other look, etc., that matches with the current location and orientation of the user in the physical world.

The computation of the different embodiments mentioned previously can be done partially or totally on servers/cloud, or at the edge of the network in order to balance the network load/cellular usage.

The above-discussed embodiments provide to a car-sharing group optimize travel efficiency by considering the efficient and cost effective combination of a shared vehicle in combination with all possible modes of transport (including public transport, shared vehicles, etc.) at drop-off locations to for all passengers to reach their final destinations.

The above-discussed embodiments increase usage of the alternate modes of transport by reserving them for the passengers at drop-off locations. The above-discussed embodiments allow the alternate modes of transport being dynamically reserved with a low cost or no cost, considering the cost function, user preferences (e.g., comfort, vehicle models, vehicle seat numbers, cruise control, etc.), and/or user context, etc.

The above-discussed embodiments support carpooling services to drop off passengers while providing comfortable alternate modes of transport to reach their respective destinations, without having this driver to bring everyone home.

The above-discussed embodiments present the navigation route with drop-off locations, intermodal route legs for each passenger in an intuitive way, and provide each passenger with the passenger's own route on the passenger's own mobile device.

The above-discussed embodiments proactively book the alternate modes of transport ahead of drop-off based on the system's computation. The above-discussed embodiments real-time monitor the travel status of the vehicle and adjust the alternate modes of transport reservations considering predictive and live traffic delays.

The above-discussed embodiments enable new car-sharing experiences using smart intermodal routing with dynamic booking capabilities. The complexity of the intermodal routing and bookings can be made simple by being automated, extended when needed, all in the background and taking into account the passenger mobility graphs, the constraints of the modes of transport and mobility providers.

The above-discussed embodiments combine different technologies (sensors, predictive parking, probability computation, multimodal routing, machine learning, etc.) to provide a platform for mobility providers to share their data and get insights of candidate multi-point intermodal routes via combining many types of data sets, thereby determining candidate vehicle drop-off locations and develop intermodal transport solutions for car-sharing.

The processes described herein for providing drop-off locations for passengers of a vehicle to reach different destinations via a multimodal route may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
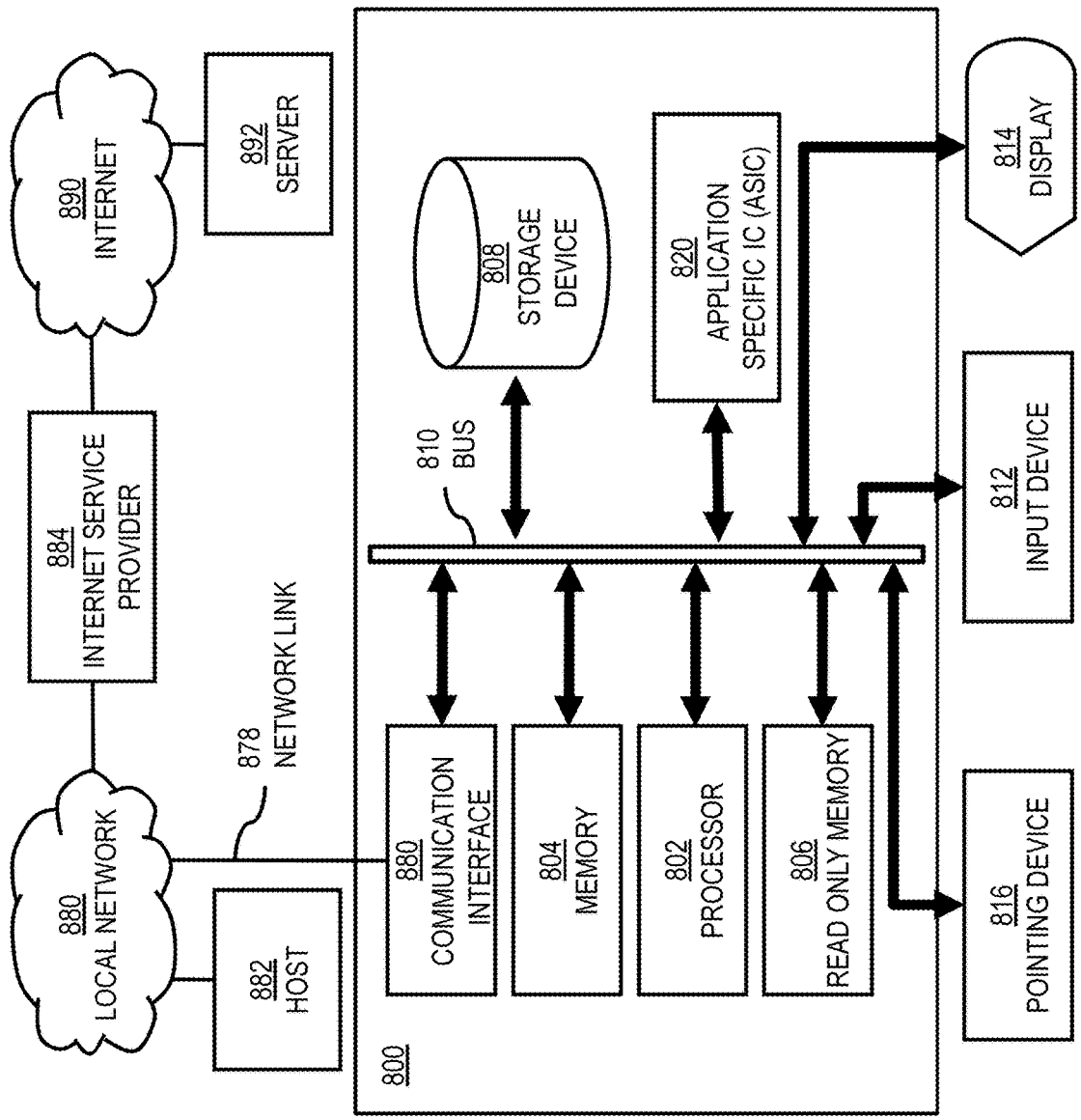
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide shared vehicle availability detection based on vehicle trajectory information as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing drop-off locations for passengers of a vehicle to reach different destinations via a multimodal route.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to provide drop-off locations for passengers of a vehicle to reach different destinations via a multimodal route. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing drop-off locations for passengers of a vehicle to reach different destinations via a multimodal route. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing drop-off locations for passengers of a vehicle to reach different destinations via a multimodal route, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 880 coupled to bus 810. Communication interface 880 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 880 may be a parallel port or a serial port or a universal serial bus (USB) port on a personal computer. In some embodiments, communications interface 880 is an integrated services digital network (ISDN) card or a digital subscriber line (DSL) card or a telephone modem that provides an information communication connection to a corresponding type of telephone line. In some embodiments, a communication interface 880 is a cable modem that converts signals on bus 810 into signals for a communication connection over a coaxial cable or into optical signals for a communication connection over a fiber optic cable. As another example, communications interface 880 may be a local area network (LAN) card to provide a data communication connection to a compatible LAN, such as Ethernet. Wireless links may also be implemented. For wireless links, the communications interface 880 sends or receives or both sends and receives electrical, acoustic or electromagnetic signals, including infrared and optical signals, that carry information streams, such as digital data. For example, in wireless devices, such as mobile computers like vehicle infotainment system, the communications interface 880 includes a radio band electromagnetic transmitter and receiver called a radio transceiver. In certain embodiments, the communications interface 880 enables connection to the communication network 107 for providing drop-off locations for passengers of a vehicle to reach different destinations via a multimodal route to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 880, carry information to and from computer system 800. Computer system 800 can send and receive information, including program code, through the networks 880, 890 among others, through network link 878 and communications interface 880. In an example using the Internet 890, a server host 892 transmits program code for a particular application, requested by a message sent from computer 800, through Internet 890, ISP equipment 884, local network 880 and communications interface 880. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 880 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide shared vehicle availability detection based on vehicle trajectory information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing drop-off locations for passengers of a vehicle to reach different destinations via a multimodal route.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide shared vehicle availability detection based on vehicle trajectory information. The memory 905 also stores the data associated with or generated by the execution of the inventive steps.

Figure 10:
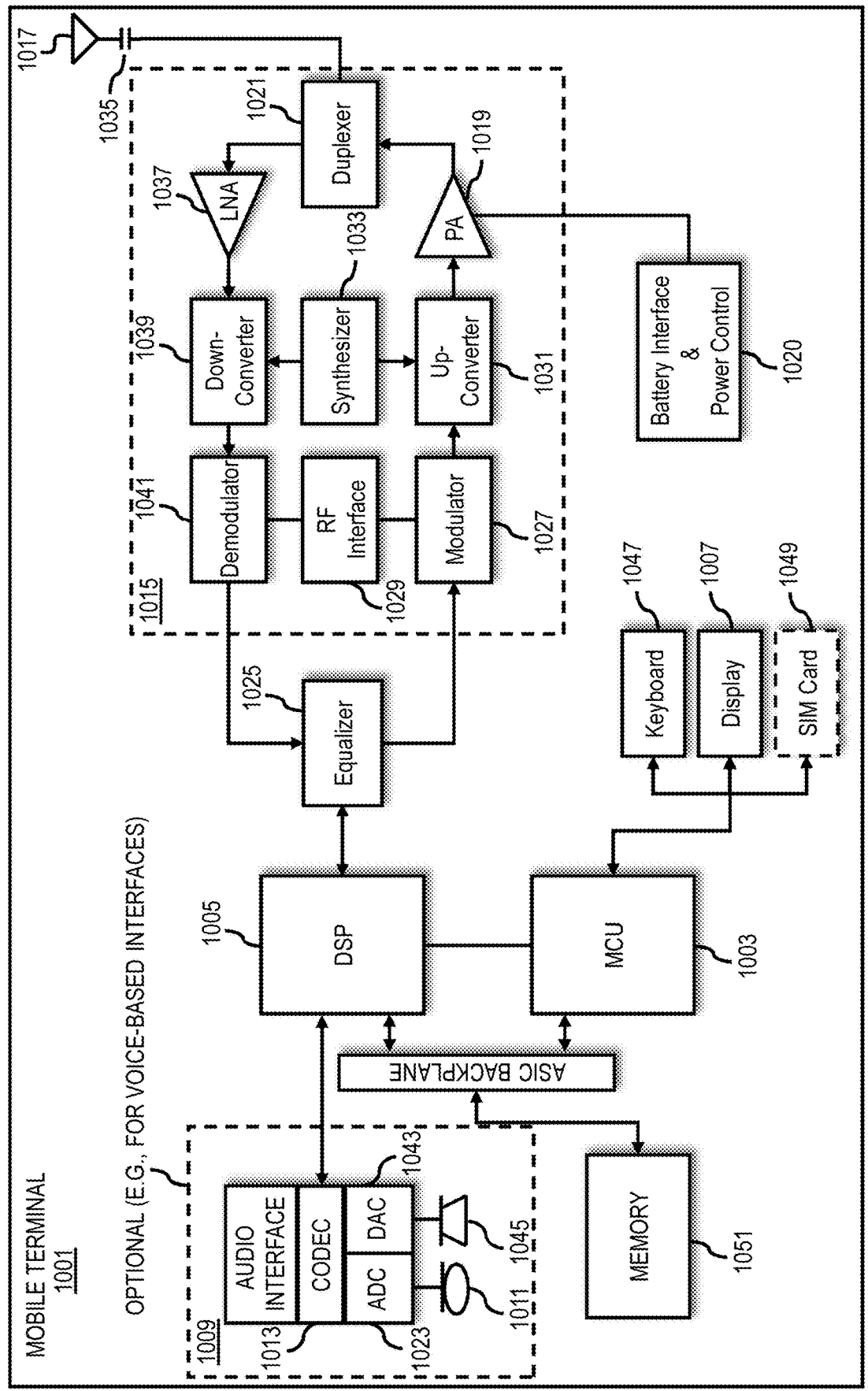
FIG. 10 is a diagram of a mobile terminal (e.g., mobile computer) that can be used to implement an embodiment of the invention.

FIG. 10 is a diagram of exemplary components of a mobile terminal 1001 (e.g., mobile computers such as vehicle infotainment system, vehicle embedded system, smartphones, etc.) for communications, which is capable of operating in the system of FIG. 1, according to one embodiment. In some embodiments, mobile terminal 1001, or a portion thereof, constitutes a means for performing one or more steps of providing drop-off locations for passengers of a vehicle to reach different destinations via a multimodal route. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 1003, a Digital Signal Processor (DSP) 1005, and a receiver/transmitter unit. In one embodiment, wherein voice-based interaction and/or communications are supported at the mobile terminal, the mobile terminal may also include a microphone gain control unit and a speaker gain control unit. A main display unit 1007 provides a display to the user in support of various applications and mobile terminal functions that perform or support the steps of providing drop-off locations for passengers of a vehicle to reach different destinations via a multimodal route. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. In embodiments supporting voice-based interactions and/or communications, an audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station (e.g., data and/or voice communications), which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, data to support providing drop-off locations for passengers of a vehicle to reach different destinations via a multimodal route is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission through the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing shared vehicle availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide shared vehicle availability detection based on vehicle trajectory information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details (e.g., data and/or voice subscriptions), and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request to generate a navigation route including a starting point, wherein the navigation route is a multi-point intermodal route that directs a plurality of passengers of a vehicle to reach a plurality of destinations using the vehicle in combination with at least one other mode of transport, and wherein the destinations are different for one or more subsets of the plurality of passengers, wherein the plurality of passengers are located at the starting point when the request to generate the navigation route is received;
   computing the navigation route based on an optimization parameter to include a route taken by the vehicle and at least one intermodal route leg, wherein the navigation route includes one or more drop-off locations where the one or more subsets of the plurality of passengers can access the at least one other mode of transport to complete the at least one intermodal route leg to at least one destination of the destinations, and wherein the optimization parameter is minimized with respect to the route taken by the vehicle, the at least one intermodal route leg, or a combination thereof;
   determining real-time information on an availability, a condition, a departure time, a delay time, or a combination thereof of the at least one other mode of transport; and
   providing the one or more drop-off locations, the navigation route, or a combination thereof as an output, wherein the navigation route, the one or more drop-off locations, the at least one intermodal route leg, or a combination thereof are determined based on the real-time information.

2. The method of claim 1, wherein the optimization parameter includes at least one of:
   a total travel time or a total travel distance for the route taken by the vehicle;
   a least amount of detour for the route taken by the vehicle, wherein the detour is determined with respect to a respective destination of the destinations that is associated with the vehicle;
   a travel time or a travel distance for the one or more subsets of the plurality of passengers;
   a quality level of the at least one intermodal route leg to the least one destination;
   a number of the one or more drop-off locations;
   a total travel time or a total travel distance for all of the plurality of passengers;
   an arrival time of a last passenger of the plurality of passengers at a last destination of the destinations;
   a safety level of the least one intermodal route leg to the least one destination; and
   a total cost for completing the navigation route to all of the destinations for said all of the plurality of passengers.

3. The method of claim 1, wherein the at least one other mode of transport includes a public transport, a shared vehicle, a taxi, a ride-hailing service, or a combination thereof.

4. The method of claim 1, further comprising:
   initiating at least one reservation of the at least one other mode of transport for the one or more subsets of the plurality of passengers to complete the at least one intermodal route leg.

5. The method of claim 1, wherein the vehicle is a shared vehicle, and wherein the navigation route includes a handover of the shared vehicle from a first passenger of the plurality of passengers to a second passenger of the plurality of passengers.

6. The method of claim 5, wherein the handover occurs on reaching a respective destination of the first passenger, the one or more drop-off location associated with the first passenger, or a combination thereof.

7. The method of claim 1, further comprising:
   computing an optimal route to a primary destination of the vehicle, wherein the primary destination is the at least one destination associated with the one or more subsets of the plurality of passengers that include a driver, a designated main passenger, or a combination thereof of the vehicle; and
   determining a corridor representing a geographic area within a threshold distance along the optimal route,
   wherein the one or more drop-off locations are selected from one or more transport hubs falling within the corridor.

8. The method of claim 1, further comprising:
   selecting the plurality of passengers from a larger group of passengers based on an optimization of the navigation route, the one or more drop-off locations, the at least one intermodal route leg, or a combination thereof.

9. The method of claim 1, further comprising:
   determining the one or more drop-off locations, the at least one destination, at least one intermodal route leg, or a combination thereof based on a mobility graph associated with the one or more subsets of the plurality of passengers.

10. An apparatus comprising:
    at least one processor; and
    at least one memory including computer program code for one or more programs,
    the at least one memory and the computer program code configured to, with the at least one processor, configured to execute the computer program code to:

receive a request to generate a navigation route including a starting point, wherein the navigation route is a multi-point intermodal route that directs a plurality of passengers of a vehicle to reach a plurality of destinations using the vehicle in combination with at least one other mode of transport, and wherein the destinations are different for one or more subsets of the plurality of passengers, wherein the plurality of passengers are located at the starting point when the request to generate the navigation route is received;

compute the navigation route based on an optimization parameter to include a route taken by the vehicle and at least one intermodal route leg, wherein the navigation route includes one or more drop-off locations where the one or more subsets of the plurality of passengers can access the at least one other mode of transport to complete the at least one intermodal route leg to at least one destination of the destinations, and wherein the optimization parameter is minimized with respect to the route taken by the vehicle, the at least one intermodal route leg, or a combination thereof;

determine real-time information on an availability, a condition, a departure time, a delay time, or a combination thereof of the at least one other mode of transport; and provide the one or more drop-off locations, the navigation route, or a combination thereof as an output, wherein the navigation route, the one or more drop-off locations, the at least one intermodal route leg, or a combination thereof are determined based on the real-time information.

11. The apparatus of claim 10, wherein the optimization parameter includes at least one of:
a total travel time or a total travel distance for the route taken by the vehicle;
a least amount of detour for the route taken by the vehicle, wherein the detour is determined with respect to a respective destination of the destinations that is associated with the vehicle;
a travel time or a travel distance for the one or more subsets of the plurality of passengers;
a quality level of the at least one intermodal route leg to the least one destination;
a number of the one or more drop-off locations;
a total travel time or a total travel distance for all of the plurality of passengers;
an arrival time of a last passenger of the plurality of passengers at a last destination of the destinations;
a safety level of the least one intermodal route leg to the least one destination; and
a total cost for completing the navigation route to all of the destinations for said all of the plurality of passengers.

12. The apparatus of claim 10, wherein the at least one other mode of transport includes a public transport, a shared vehicle, a taxi, a ride-hailing service, or a combination thereof.

13. The apparatus of claim 10, wherein the apparatus is further caused to:
compute an optimal route to a primary destination of the vehicle, wherein the primary destination is the at least one destination associated with the one or more subsets of the plurality of passengers that include a driver, a designated main passenger, or a combination thereof of the vehicle; and determine a corridor representing a geographic area within a threshold distance along the optimal route, wherein the one or more drop-off locations are selected from one or more transport hubs falling within the corridor.

14. A non-transitory computer-readable storage medium carrying one or more sequences of one or more instructions which, when executed by one or more processors, cause an apparatus to at least perform the following steps:
receiving a request to generate a navigation route including a starting point, wherein the navigation route is a multi-point intermodal route that directs a plurality of passengers of a vehicle to reach a plurality of destinations using the vehicle in combination with at least one other mode of transport, and wherein the destinations are different for one or more subsets of the plurality of passengers, wherein the plurality of passengers are located at the starting point when the request to generate the navigation route is received;
computing the navigation route based on an optimization parameter to include a route taken by the vehicle and at least one intermodal route leg, wherein the navigation route includes one or more drop-off locations where the one or more subsets of the plurality of passengers can access the at least one other mode of transport to complete the at least one intermodal route leg to at least one destination of the destinations, and wherein the optimization parameter is minimized with respect to the route taken by the vehicle, the at least one intermodal route leg, or a combination thereof;
determining real-time information on an availability, a condition, a departure time, a delay time, or a combination thereof of the at least one other mode of transport; and
providing the one or more drop-off locations, the navigation route, or a combination thereof as an output, wherein the navigation route, the one or more drop-off locations, the at least one intermodal route leg, or a combination thereof are determined based on the real-time information.

15. The non-transitory computer-readable storage medium of claim 14, wherein the optimization parameter includes at least one of:
a total travel time or a total travel distance for the route taken by the vehicle;
a least amount of detour for the route taken by the vehicle, wherein the detour is determined with respect to a respective destination of the destinations that is associated with the vehicle;
a travel time or a travel distance for the one or more subsets of the plurality of passengers;
a quality level of the at least one intermodal route leg to the least one destination;
a number of the one or more drop-off locations;
a total travel time or a total travel distance for all of the plurality of passengers;
an arrival time of a last passenger of the plurality of passengers at a last destination of the destinations;
a safety level of the least one intermodal route leg to the least one destination; and
a total cost for completing the navigation route to all of the destinations for said all of the plurality of passengers.

16. The non-transitory computer-readable storage medium of claim 14, wherein the at least one other mode of transport includes a public transport, a shared vehicle, a taxi, a ride-hailing service, or a combination thereof.

17. The non-transitory computer-readable storage medium of claim 14, wherein the apparatus is caused to further perform:
- computing an optimal route to a primary destination of the vehicle, wherein the primary destination is the at least one destination associated with the one or more subsets of the plurality of passengers that include a driver, a designated main passenger, or a combination thereof of the vehicle; and
- determining a corridor representing a geographic area within a threshold distance along the optimal route,
- wherein the one or more drop-off locations are selected from one or more transport hubs falling within the corridor.

* * * * *